(12) United States Patent
Bacila et al.

(10) Patent No.: US 9,288,605 B2
(45) Date of Patent: Mar. 15, 2016

(54) APPARATUS AND A METHOD FOR SUPPLYING INFORMATION

(75) Inventors: Horea Bacila, Cluj (RO); Ovidiu Ban, Surrey (GB); Mirela Boboc, Surrey (GB); Catalin Suciu, Bihor (RO); Mihai Spatar, Surrey (GB)

(73) Assignee: Quest Patent Research Corporation, Jericho, NY (US)

( * ) Notice: Subject to any disclaimer, the term of this patent is extended or adjusted under 35 U.S.C. 154(b) by 0 days.

(21) Appl. No.: 12/617,373

(22) Filed: Nov. 12, 2009
(Under 37 CFR 1.47)

(65) Prior Publication Data
US 2010/0125551 A1    May 20, 2010

Related U.S. Application Data

(63) Continuation of application No. 11/673,691, filed on Feb. 12, 2007, now abandoned, which is a continuation of application No. 09/926,751, filed as application No. PCT/RO00/00008 on Apr. 13, 2000, now Pat. No. 7,194,468.

(51) Int. Cl.
*G06F 17/30* (2006.01)
*H04W 4/00* (2009.01)
(Continued)

(52) U.S. Cl.
CPC ............... *H04W 4/00* (2013.01); *G06Q 40/06* (2013.01); *H04L 12/1804* (2013.01);
(Continued)

(58) Field of Classification Search
USPC ............. 709/227, 201, 203, 237; 705/1.1, 37, 705/39; 707/600, 602, 607, 781, 782, 784, 707/953, 957
See application file for complete search history.

(56) References Cited

U.S. PATENT DOCUMENTS

| 4,024,899 A | 5/1977 | Stewart |
| 4,745,559 A | 5/1988 | Willis et al. |

(Continued)

FOREIGN PATENT DOCUMENTS

| DE | 199 38 576 | 3/2000 |
| DE | 19938576 | 3/2000 |

(Continued)

OTHER PUBLICATIONS

Brusic et al., Deployment of Mobile Agents in the Mobile Telephone Network Management, System Sciences, 2000. Proceedings of the 33rd Hawaii International Conference on, Jan. 4-7, 2000, 9 pp.

(Continued)

*Primary Examiner* — Greta Robinson
(74) *Attorney, Agent, or Firm* — Renner, Otto, Boisselle & Sklar, LLP

(57) ABSTRACT

An apparatus is provided with a first receiver for receiving changing information relating to a plurality of different sets of data such as financial data and a second receiver for receiving said changing information in synchronism with said first receiver means. A data base is provided to store information received by the first receiver and a subscriber profile store stores information associating a subscriber with a group of said different sets of data. The apparatus is arranged to supply, via the mobile telecommunications network, information from the data base for the group of data sets associated in the subscriber profile store with a subscriber when communication with that subscriber is first established and thereafter to supply changing information relating to the group of data sets associated with that subscriber directly to the subscriber from the second receiver.

8 Claims, 17 Drawing Sheets

(51) Int. Cl.
*G06Q 40/06* (2012.01)
*H04L 12/18* (2006.01)
*H04M 3/42* (2006.01)
*H04M 3/487* (2006.01)
*H04L 29/08* (2006.01)
*H04M 3/38* (2006.01)
*H04W 8/18* (2009.01)

(52) U.S. Cl.
CPC .......... *H04L 67/26* (2013.01); *H04M 3/42068* (2013.01); *H04M 3/4872* (2013.01); *H04L 12/189* (2013.01); *H04L 12/1859* (2013.01); *H04L 12/1895* (2013.01); *H04M 3/382* (2013.01); *H04M 3/42153* (2013.01); *H04M 2207/18* (2013.01); *H04W 8/18* (2013.01); *Y10S 707/99939* (2013.01)

(56) References Cited

U.S. PATENT DOCUMENTS

| | | | |
|---|---|---|---|
| 5,270,922 A * | 12/1993 | Higgins | 705/37 |
| 5,404,488 A | 4/1995 | Kerrigan et al. | |
| 5,687,363 A | 11/1997 | Oulid-Aissa et al. | |
| 5,740,549 A | 4/1998 | Reilly et al. | |
| 5,754,774 A | 5/1998 | Bittinger et al. | |
| 5,790,935 A * | 8/1998 | Payton | 725/91 |
| 5,819,284 A | 10/1998 | Farber et al. | |
| 5,832,076 A | 11/1998 | Holthaus et al. | |
| 5,835,757 A | 11/1998 | Oulid-Aissa et al. | |
| 5,872,921 A | 2/1999 | Zahariev et al. | |
| 5,893,076 A | 4/1999 | Hafner et al. | |
| 5,987,432 A | 11/1999 | Zusman et al. | |
| 6,003,087 A | 12/1999 | Housel, III et al. | |
| 6,018,747 A | 1/2000 | Burns et al. | |
| 6,119,163 A * | 9/2000 | Monteiro et al. | 709/227 |
| 6,233,607 B1 | 5/2001 | Taylor et al. | |
| 6,298,373 B1 | 10/2001 | Burns et al. | |
| 6,321,212 B1 | 11/2001 | Lange | |
| 6,460,084 B1 * | 10/2002 | Van Horne et al. | 709/227 |
| 6,553,346 B1 | 4/2003 | Walker et al. | |
| 6,587,836 B1 | 7/2003 | Ahlberg et al. | |
| 6,587,867 B1 | 7/2003 | Miller et al. | |
| 6,618,707 B1 | 9/2003 | Gary | |
| 6,684,194 B1 * | 1/2004 | Eldering et al. | 705/7.33 |
| 6,804,675 B1 | 10/2004 | Knight et al. | |
| 6,829,590 B1 | 12/2004 | Greener et al. | |
| 6,934,687 B1 * | 8/2005 | Papierniak et al. | 705/10 |
| 7,194,468 B1 | 3/2007 | Bacila et al. | |
| 7,516,196 B1 * | 4/2009 | Madan et al. | 709/219 |
| 7,529,704 B1 * | 5/2009 | Breslow et al. | 705/37 |

FOREIGN PATENT DOCUMENTS

| | | |
|---|---|---|
| EP | 0 820 183 | 1/1998 |
| EP | 0954146 A | 11/1999 |
| GB | 2 334 648 | 8/1998 |
| GB | 2 334 648 A | 8/1999 |
| GB | 2334648 | 8/1999 |
| JP | 58 195917 | 11/1983 |
| JP | 58-195917 | 11/1983 |
| WO | 97 41654 | 11/1997 |
| WO | 97/41654 | 11/1997 |
| WO | WO 97/41654 | 11/1997 |
| WO | 99/33293 | 7/1998 |
| WO | 99 33293 | 7/1999 |
| WO | 99 65265 | 12/1999 |
| WO | 99/65265 | 12/1999 |
| WO | 01/71557 | 9/2001 |
| WO | WO 01/71557 A2 | 9/2001 |
| WO | 02/23394 | 3/2002 |
| WO | WO/02/23394 A1 | 3/2002 |

OTHER PUBLICATIONS

WebExpress: A System for Optimizing Web Browsing in a Wireless Environment Mobicom '96, Nov. 11/12, 1996. http:portal.acm.org/citation.cfm?id=236416&dl=ACM&coll=portal.

In-Place Reconstruction of Delta Compressed Files (1998) Jun. 28-Jul. 2, 1998 http://www.podc.org/podc98/ , http://citeseer.ist.psu.edu/122952.html.

WebExpress: A System for Optimizing Web Browsing in a Wireless Environment Mobicom '96, Nov. 11, 1996 and Nov. 12, 1996, http-:portal.acm.org/citation.cfm?id=236416&dl=ACM&coll=portal.

In-Place Reconstruction of Delta Compressed Files (1998) Jun. 28, 1998 through Jul. 2, 1998, http://www.podc.org/podc98/, http://citeseer.ist.psu.edu/122952.html.

Non-Final Office Action for U.S. Appl. No. 13/832,012 dated Sep. 4, 2013.

The IEEE Standard Dictionary of Electrical and Electronic Terms, 6th Ed., Dec. 10, 1996, p. 823.

"A Pocket Monitor For Stock Quotes," The New York Times, published Apr. 28, 1984.

Hauswirth, Manfred, A Reference Architecture for Push Systems, Distributed Systems Group, Technical University of Vienna, 1998.

* cited by examiner

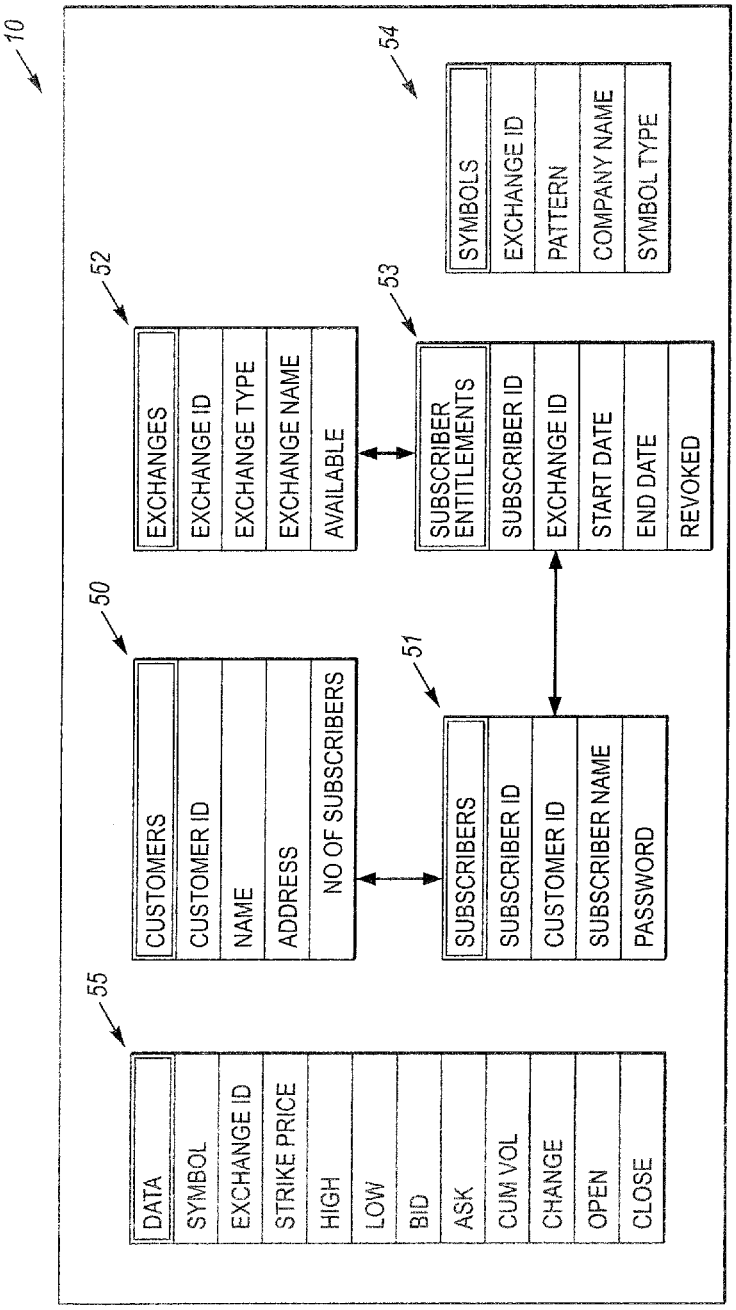

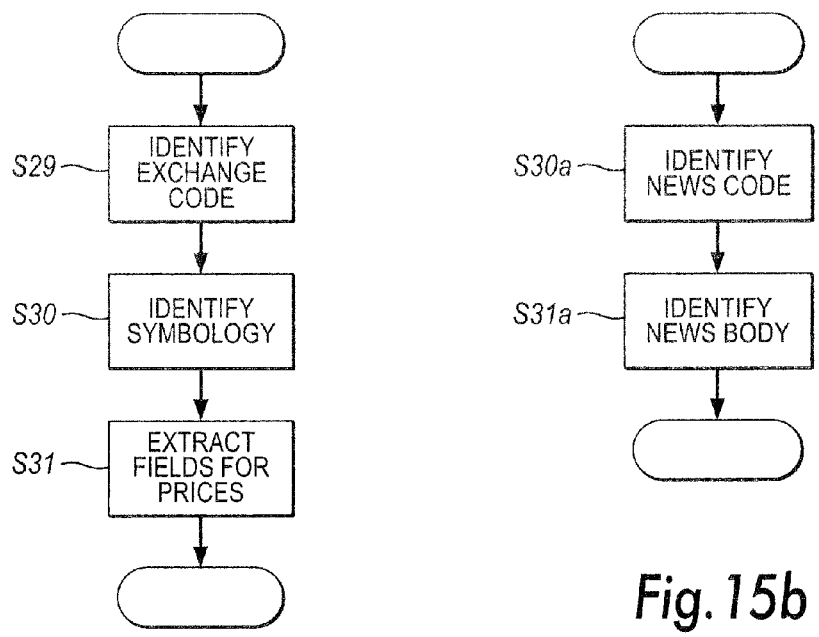
*Fig. 15a*
*Fig. 15b*
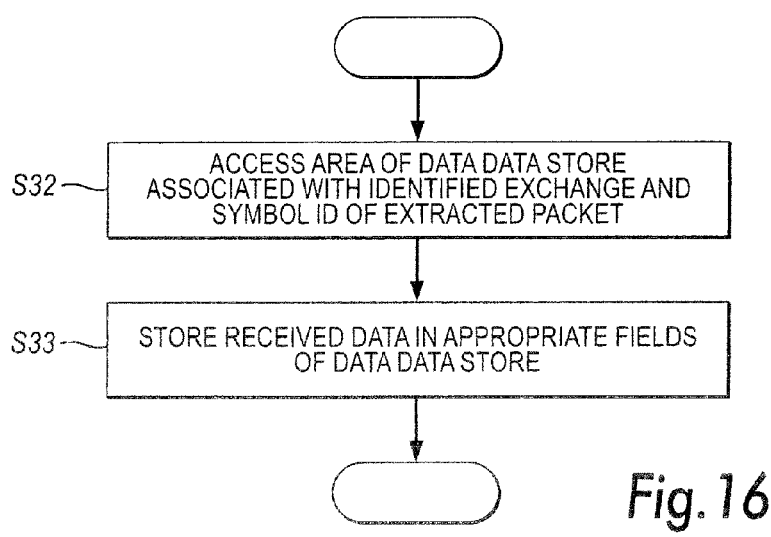
*Fig. 16*

| FTSE 100 Index Future/LIFFE [a1] | | | | | | | | |
|---|---|---|---|---|---|---|---|---|
| EXP DATE | LAST | BID | ASK | HIGH | LOW | CUM VOL | CHANGE | CLOSE |
| Mar2000 | 6331.5 | ■ | 6332.0 | 6350.0 | 6279.0 | 15163 | -56.0 | 0 |
| Jun2000 | 6394.0 | 6387.5 | 6397.0 | 6394.0 | 6391.5 | 16 | -58.5 | 0 |
| Sep2000 | 6521.5 | 6454.0 | 6469.0 | 0 | 0 | 0 | 0 | 0 |

*Fig.27*

| 7.5% NEDERLAND 1993/2023 (NLL) OPTION/European Options Exchange/Feb2000 | | | | | | |
|---|---|---|---|---|---|---|
| CALLS BID | CALLS ASK | CALLS LAST | STRIKE PRICE | PUTS BID | PUTS ASK | PUTS LAST |
| 3.30 | 4.30 | 3.80 | 113 | 0.10 | 0.70 | 0.70 |
| 2.40 | 3.40 | 2.90 | 114 | 0.20 | 0.80 | 0.90 |
| 1.60 | 2.60 | 2.20 | 115 | 0.10 | 0.10 | 1.10 |
| 0.90 | 1.90 | 1.60 | 116 | 0.30 | 1.30 | 1.50 |
| 0.70 | 1.70 | 1.20 | 117 | 1.10 | 2.10 | 2.10 |
| 0.10 | 1.10 | 1.00 | 118 | 1.40 | 2.30 | 2.80 |
| 0.10 | 0.90 | 0.80 | 119 | 2.10 | 3.10 | 3.60 |
| 0.10 | 0.80 | 0.70 | 120 | 3.00 | 4.00 | 4.50 |
| 0.05 | 0.70 | 0.60 | 121 | 3.90 | 4.90 | 5.50 |
| 0.10 | 0.60 | 0.50 | 122 | 4.90 | 5.90 | 6.40 |

*Fig.28*

| 5.5% NEDERLAND 1998/28 (NLY) OPTION/European Options Exchange/Feb2000 [f2] | | | | | | | |
|---|---|---|---|---|---|---|---|
| STRIKE P | Put/Call | BID | HIGH | LOW | CHANGE | TIME | DATE |
| 89 | C | 2.20 | 3.20 | 3.20 | 1.00 | 16:22 | 01/31/00 |
| 89 | P | 0.20 | 0.60 | 0.60 | 0 | 16:22 | 01/31/00 |
| 90 | C | 1.30 | 2.30 | 2.30 | 0.90 | 16:22 | 01/31/00 |
| 90 | P | 0.20 | 0.70 | 0.70 | 0 | 16:22 | 01/31/00 |
| 91 | C | 0.80 | 1.50 | 1.50 | 0.50 | 16:22 | 01/31/00 |
| 91 | P | 0.20 | 0.90 | 0.90 | -0.30 | 16:22 | 01/31/00 |
| 92 | C | 0.20 | 0.90 | 0.90 | 0.10 | 16:22 | 01/31/00 |
| 92 | P | 0.20 | 1.20 | 1.20 | -0.60 | 16:22 | 01/31/00 |
| 93 | C | 0.10 | 0.70 | 0.70 | 0 | 16:22 | 01/31/00 |
| 93 | P | 0.90 | 1.90 | 1.90 | -0.70 | 16:22 | 01/31/00 |

*Fig.29*

| Composite | | | | | | | | | |
|---|---|---|---|---|---|---|---|---|---|
| CONTR | EXPD | LAST | BID | ASK | HIGH | LOW | CUMIVOL | CHANGE | CLOSE |
| IHO | Mar2000 | 96.305 | 96.300 | 96.305 | 96.310 | 96.285 | 37329 | 0.010 | 0 |
| LHO | Mar2000 | 93.640 | 93.640 | 93.650 | 93.670 | 93.620 | 18294 | -0.020 | 0 |
| OHO | Mar2000 | 97.67 | 97.71 | 98.19 | 0 | 0 | 0 | 0 | 0 |
| OHO | Mar2000 | 3475.0 | 3475.0 | 3510.0 | 3498.5 | 3475.0 | 123 | -74.0 | 0 |
| SHO | Mar2000 | 97.700 | 97.700 | 97.730 | 97.750 | 97.680 | 11641 | -0.050 | 0 |
| THO | Mar2000 | 99.860 | 0 | 0 | 0 | 0 | 0 | 0.015 | 99.0860 |
| XHO | Mar2000 | 102.05 | 101.31 | 102.04 | 102.12 | 101.55 | 133 | 0.80 | 0 |

Fig.30

| FOREX/DEPO | | | | | | | | |
|---|---|---|---|---|---|---|---|---|
| CROSS | USD | GBP | CHF | JPY | CAD | EUR | DKK | NOK |
| USD | | 1.6217 | 1.6471 | 107.36 | 1.4487 | | 7.6161 | 8.2835 |
| GBP | 0.6167 | | 2.6706 | 174.09 | 2.3516 | 1.6592 | 12.345 | 13.4320 |
| CHF | 0.6071 | 0.3744 | | 65.22 | 0.8803 | 0.6215 | 0.05 | 5.0276 |
| JPY | 0.01 | 0.01 | 1.5331 | | 1.3499 | 0.01 | 0.0711 | |
| CAD | 0.6903 | 0.4252 | 1.1356 | 72.700 | | 0.7057 | 5.2549 | 5.7143 |
| EUR | | 0.6027 | 1.6091 | 104.91 | 1.4170 | | 7.4425 | 8.0935 |
| DKK | 0.1313 | 0.081 | 21.62 | 14.0557 | 0.1903 | 0.1344 | | 1.0861 |
| NOK | 0.1207 | 0.0744 | 19.88 | | 0.1750 | 0.1236 | 0.9207 | |

Fig.31

| Composite Indices | | | | | | | |
|---|---|---|---|---|---|---|---|
| Index | Trade | Open | High | Low | Settle | P/Settle | Change |
| Amsterdam... | 612.38 | 621.65 | 625.02 | 609.96 | 0 | 632.46 | -20.08 |
| FTSE 100 -... | 6265.20 | 6375.60 | 6375.60 | 6246.80 | 0 | 6375.60 | -110.40 |
| Kuala Lump... | 922.10 | 927.48 | 927.48 | 922.10 | 0 | 935.57 | -13.47 |
| Madrid Gen... | 977.83 | 976.56 | 977.83 | 976.56 | 0 | 988.54 | -10.71 |
| NZ Top 40... | 2055.22 | 2055.22 | 2055.22 | 2055.22 | 2055.22 | 2059.07 | -3.85 |
| Shanghai | 1631.52 | 1631.52 | 1631.52 | 1631.52 | 1631.52 | 1601.57 | 29.95 |
| Straits Tim... | 2230.28 | 2234.82 | 2234.82 | 2225.30 | 0 | 2284.91 | -54.63 |

Fig.32

| LSE | | | | | | | |
|---|---|---|---|---|---|---|---|
| Symbol | Company | LAST | CHANGE | HIGH | LOW | BID | ASK |
| GBP\CNVE\... | 1ST IRELA... | 190 | -4 | 192 | 190 | 188 | 192 |
| GBX\SEAQ\... | 3I UK SELE... | 113.5 | -1.5 | 115.5 | 113.5 | 112 | 115 |
| USD\CNVE\... | 5 ARROWS... | 2.8400 | -0.0200 | 2.8500 | 2.8400 | 2.8200 | 2.8600 |
| GBP\GILT\... | 7%07JUN2... | 85.7060 | 0 | 85.7240 | 85.7240 | 0 | 0 |
| GBP\MISC\... | A.B.PORTS... | 139.30859 | -021875 | 139.30859 | 139.30859 | 0 | 0 |
| GBP\MISC\... | A.B.PORTS... | 95.45313 | 0 | 95.45313 | 95.45313 | 0 | 0 |
| GBP\MISC\... | A.B.PORTS... | 135.30859 | -0.25 | 135.30859 | 135.30859 | 0 | 0 |
| GBX\SEAQ\... | A.DE GRUC... | | | | | | |
| GBX\SEAQ\... | ABACUS P... | 350 | 0 | 350 | 350 | 345 | 355 |
| GBP\MISC\... | ABBEY N.S... | 105.15234 | 0 | 105.15234 | 105.15234 | 0 | 0 |

Fig.33

News - Times quoted in UK GMT

19:38 - CBT Corn Review: Down as most contracts gap to 2-week lows
19:37 - NYMEX access volumes breakdown - Jan 31

Fig.34

-: 19:37- NYMEX access volumes breakdown - Jan 31

Jan. 31-MAR--

[B] NYMEX access volumes breakdown-Jan 31

Note: Refer to FSN 1923 to get NYMEX access final volumes.

CRUDE OIL  HEATING OIL  UNLEADED GAS  NATURAL GAS  PLATINUM
Feb    0  Feb   80  Feb   5  Feb    0  Apr00 21
Mar 2,925  Mar  145  Mar   5  Mar    0  ttl   21
Apr 1,149  Apr    0  Apr   0  Apr    0

Fig.35

APPARATUS AND A METHOD FOR SUPPLYING INFORMATION

This application is a continuation application of Ser. No. 11/63,691 filed Feb. 12, 2007, now abandoned, which is a continuation application of Ser. No. 09/926,751 filed Dec. 12, 2001, which issued as U.S. Pat. No. 7,194,468 on Mar. 20, 2007, and which is a National Stage of PCT/RO00/00008 filed Apr. 13, 2000.

BACKGROUND OF THE INVENTION

1. Field of the Invention

This invention relates to apparatus and a method for supplying information. In particular, this invention relates to apparatus and a method for supplying to a subscriber via a mobile telecommunications network different types of information that are updated in real time, for example, information relating to financial markets.

2. Related Art

Information relating to financial markets changes rapidly throughout the trading day to such an extent that, at busy periods or when there is particular interest in a particular stock, option or currency, changes occur as frequently as once a second or even more rapidly. Although advances in telecommunications and, in particular, satellite telecommunications technology enable traders to receive continually updating finance and market information on desktop personal computers in their offices over dedicated communication links, the bandwidth of the current GSM standard mobile telecommunications network does not allow the supply of real time updating information such as financial market information over the mobile telecommunications network, so making it difficult for traders and the like to keep up to date with changes in the financial markets when away from their offices. Although changes envisaged to the mobile telecommunications standard will increase the available bandwidth over the mobile telecommunications networks, this increase is unlikely to be sufficient to enable receipt of real time updating information such as financial market information over a mobile telecommunications network.

BRIEF SUMMARY OF THE INVENTION

It is an aim of the present information to provide an apparatus and method for enabling a subscriber to receive via a mobile telecommunications network information that is updated in real time such as financial market information.

In one aspect, the present invention provides apparatus for supplying to a subscriber via a mobile telecommunications network different sets of data that are updated in real time, the apparatus comprising:

first receiving means for receiving said different sets of data;

second receiving means for receiving said different sets of data in synchromism with said first receiving means;

a database for storing said different sets of data received by said first receiving means;

communication means for establishing communication with a subscriber via a mobile telecommunication network;

a subscriber profile store for storing data indicating which of the different sets of data a subscriber is interested in;

means for supplying initial information concerning the sets of data that a subscriber is interested in from the database when communication with the subscriber is established; and means for supplying information concerning the sets of data that a subscriber is interested in from said Second receiving means to the subscriber after said initial information has been supplied.

In one aspect, the present invention provides apparatus for supplying to a subscriber via a mobile telecommunications network changing information for each of a plurality of different sets of data, the apparatus comprising:

first receiving means for receiving said changing information;

second receiving means for receiving said changing information in synchronism with said first receiving means;

a database for storing information received by the first receiving means relating to said different sets of data;

communication means for establishing communication with a portable computer of a subscriber via a mobile telecommunications network;

a subscriber profile store for storing information associating a subscriber with a group of said different sets of data;

means for supplying to a subscriber's portable computer via the mobile telecommunications network information from the database for the group of data sets associated with that subscriber when communication with that subscriber's portable computer is established; and means for supplying from said second receiving means to the subscriber's portable computer changing information relating to the group of data sets associated with that subscriber in the subscriber profile store once said initial information has been supplied to the subscriber.

In an embodiment, the present invention provides apparatus that enables a subscriber to receive via a mobile telecommunications network initial data for initialising the presentation on a display of the subscriber's portable computer of information relating to different sets of data such as financial market data and then, once the initialisation procedure has been completed, supplies only changes to that group of data to the portable computer over the mobile telecommunications network so that, once the initialisation has been completed, the only data that needs to be supplied over the mobile telecommunications data is data that has changed since the initialisation procedure. This reduces the amount of data that has to be supplied to the subscriber and so facilitates supply of continually changing data such as financial market data virtually in real time over a mobile telecommunications network.

BRIEF DESCRIPTION OF THE SEVERAL VIEWS OF THE DRAWING(S)

Embodiments of the present invention will now be described, by way of example, with reference to the accompanying drawings, in which:

FIGS. 7a and 7b show basic elements of a data structure for sets of data supplied to the service provider shown in FIG. 1 with FIGS. 7a and 7b representing price information and news information respectively;

FIG. 8 shows different data stores of a database of the service provider shown in FIG. 2;

FIGS. 15a and 15b show steps carried out by the parser shown in FIG. 2 or the parser shown in FIG. 3 for price and news information respectively;

FIG. 16 shows further steps carried out by the parser shown in FIG. 2 to store data in the database;

FIGS. 27 to 35 show typical examples of how data supplied by apparatus embodying the invention is displayed on the display of a subscriber's portable computer.

DETAILED DESCRIPTION OF THE INVENTION

Figure 1:
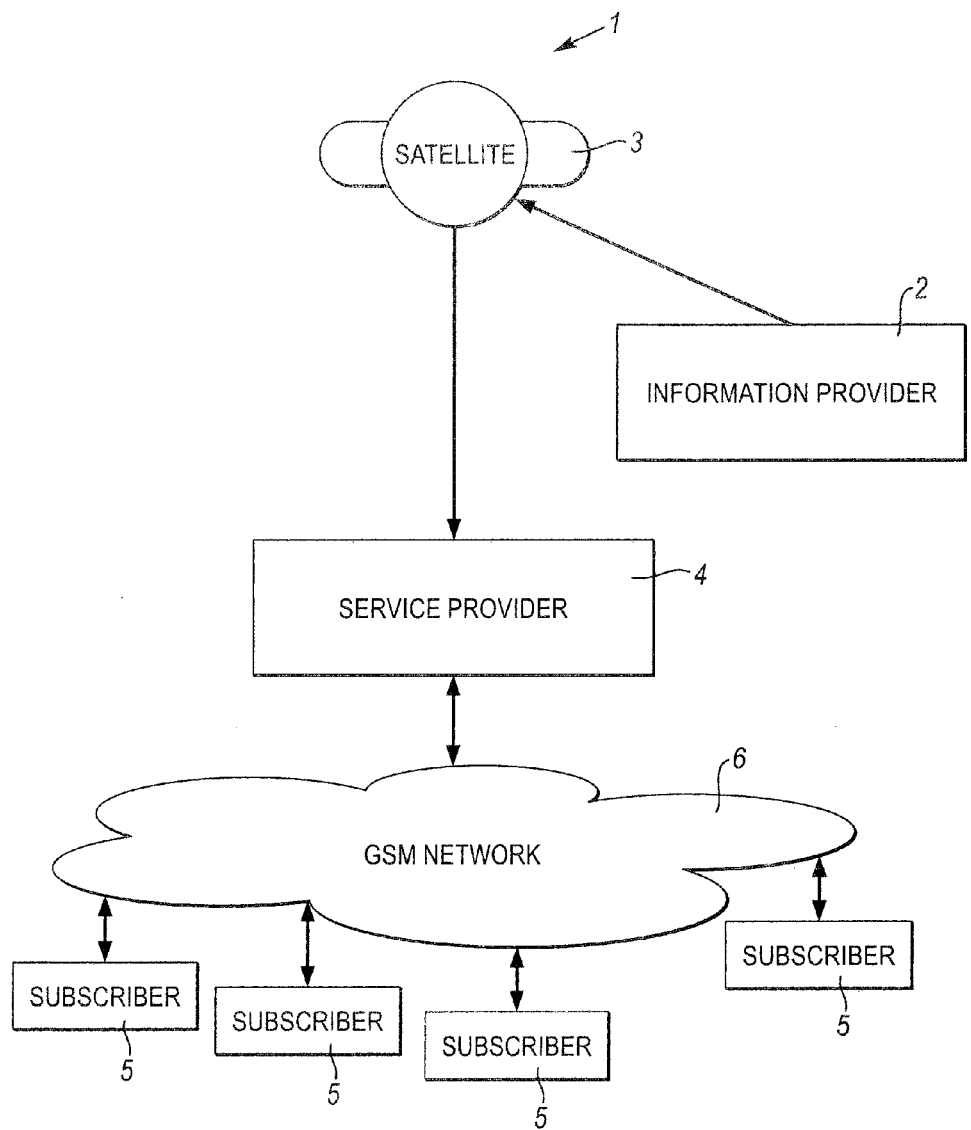
FIG. 1 shows a diagrammatic representation of a system embodying the present invention for supplying to a subscriber via a mobile telecommunications network, different sets of changing or continually updating data.

FIG. 1 shows a diagrammatic representation of a system 1 for supplying continually updating or changing information for sets of data to a plurality of subscribers.

In this system 1, an information provider 2 provides continually updating information regarding a plurality of sets of data to a service provider 4 via a satellite 3 communications link. The service provider 4 provides continually updating information for specific ones of the sets of data of interest to a subscriber to each of a plurality of subscribers 5a, 5b, 5c, and 5d via a GSM mobile telecommunications network 6.

In the embodiments to be described below, the information provider 2 provides continually updating data relating to financial trading markets, in particular commodities (futures and options), stocks, indices and foreign exchanges and news. The information provider 2 may be, for example, Standard and Poor's ComStock XpressFeed that provides access to real time prices for futures and options exchanges, stock exchanges, index exchanges and Forex (foreign exchange) and also acts as to supply real time financial news. The specific financial market, exchanges and news services for which real time data is provided is determined by the information provider 2. It will, of course, be appreciated that information providers 2, other than Standard and Poor's ComStock XpressFeed, may be used for example, information providers such as Bloomberg and Reuters.

Figure 2:
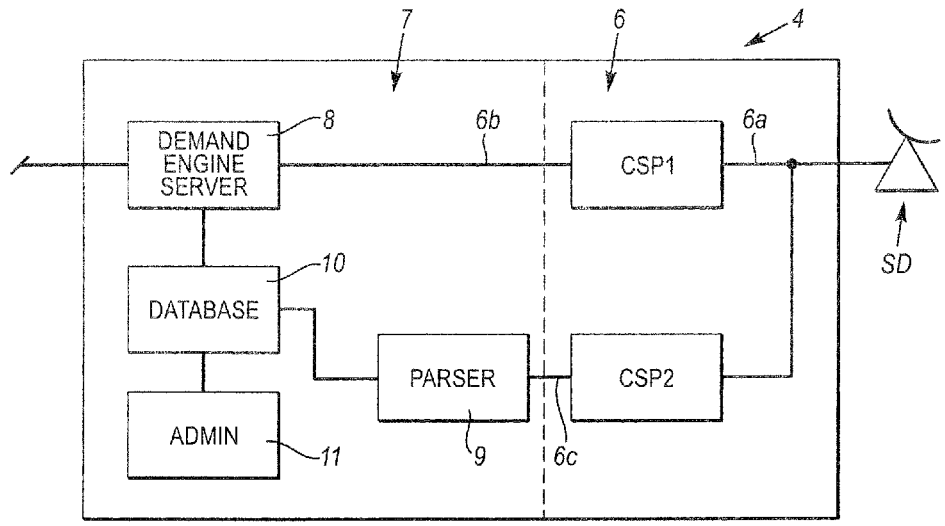
FIG. 2 shows a block diagram illustrating functional components of a service provider shown in FIG. 1.

FIG. 2 shows a functional block diagram of the service provider 4. The service provider 4 consists of information receiving apparatus 6 that receives information via the satellite link 3 from the information provider 2 and information supplying apparatus 7 that is configured to supply continually updating information to subscribers over the GSM network 6.

The information receiving apparatus 6 consists of two client site processors CSP1 and CSP2 provided by Standard and Poor. The client site processors CSP1 and CSP2 are each coupled via a communications link 6a to a satellite dish SD to enable both client site processors CSP1 and CSP2 to receive an encrypted data stream over the satellite network 3 from the information provider 2.

Each of the client site processors CSP1 and CSP2 is arranged to decrypt and demodulate the received encrypted data stream and to maintain a local database of the financial data provided via the satellite network 3 by the information provider 2.

Each of the client site processors CSP1 and CSP2 allows a single client connection 6b and 6c using the TCP/IP protocol so that a client connected to the client site processor can receive via the TCP/IP connection real time updating financial data provided by the information provider 2 via the satellite 3 link.

The actual financial markets, exchanges and news services for which real time updating data can be obtained by the client via the TCP/IP connection to the client site processor will be determined by the configuration of the client site processor which will itself be determined by the contractual arrangement between the service provider 4 and the information provider 2.

The arrangement described so far differs from a conventional arrangement where the information provider 2 is providing real time updating financial data via a client site processor to a desktop personal computer or a network of desktop personal computers each of which can receive and display the real time updating financial data because two client site processors CSP1 and CSP2 are provided which are identically configured and which are coupled via a single communications link 6a to the satellite receiving dish SD. The two client site processors CSP1 and CSP2 thus receive and supply the real time updating data in a stream of packets in synchronism with one another to their respective TCP/IP connections 6b and 6c.

The subscriber information supplying apparatus 7 comprises a demand engine server 8 connector via the first TCP/IP connection 6b to the client site processor CSP1 and a parser 9 connected via the second TCP/IP connection 6c to the client site processor CSP2. As will be described in detail below the demand engine server 8 is arranged to supply data received over the TCP/IP connection 6b to subscribers via a GSM network 6 (FIG. 1) while the parser 9 is arranged to cause data received over the TCP/IP connection 6c to be stored in a database 10 of the subscriber information supplying apparatus 7.

The subscriber information supplying apparatus 7 also includes an administration unit 11 for enabling a systems operator to have access to the subscriber information supplying apparatus 7 to allow, for example, configuration of the database 10 as will be described below.

The block diagram shown in FIG. 2 is intended only to illustrate the functions carried out by the service provider 4. In practice the subscriber information supplying apparatus 7 may consist of a multiprocessor distributed processing system using Windows NT version 4.0 or higher operating system, Microsoft SQL server version 7.0 and Microsoft Access 97 or other database software. Typically, the multiprocessor system will consist of four processors and the functions illustrated by the blocks shown in FIG. 2 will be distributed amongst the processors of the multiprocessor system in conventional manner.

Figure 3:
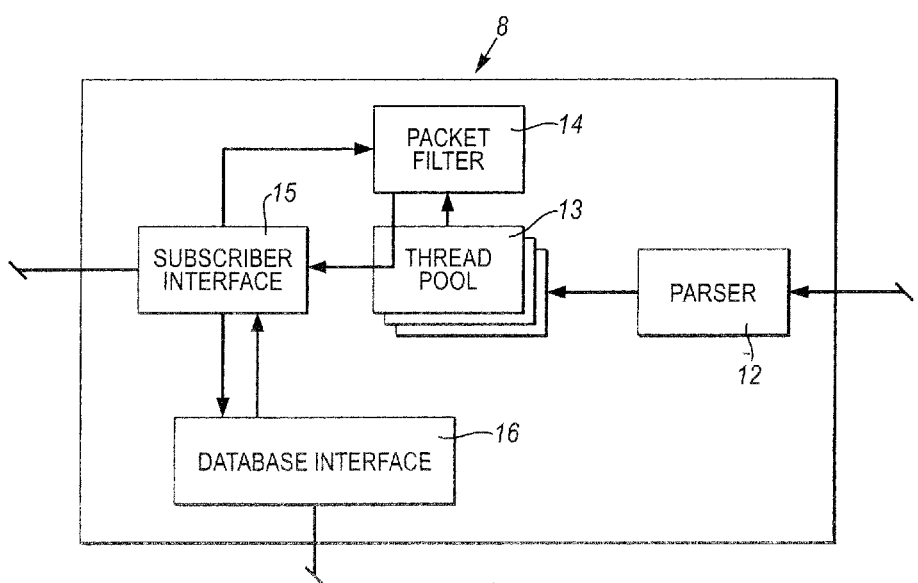
FIG. 3 shows a block diagram illustrating functional components of a demand engine server of the service provider shown in FIG. 2.

FIG. 3 shows a functional block diagram of the demand engine server 8. The demand engine server 8 consists of a parser 12, a thread pool 13, a packet filter or subscriber profile store 14 and subscriber and database interfaces 15 and 16.

As will be described in greater below, when a subscriber initially establishes communication with the service provider 4 over the GSM network 6, the demand engine server 8 allocates to that subscriber a thread 13 which is part of the subscriber interface 15 that accesses via the database interface 16 the data stored in the database 10 in respect of the sets of data in which the subscriber is interested and causes that accessed data to be communicated to the subscriber over the GSM network 6 so as to provide the subscriber with initial values for the sets of data in which the subscriber is interested. The subscriber interface 15 also causes the packet filter or client profile store 14 to store data associating the subscriber with the sets of data in which the subscriber is interested. The parser 12 is arranged to extract data from the data stream provided via the TCP/IP connection 6c, to determine from the packet filter 14 which of the connected subscribers are interested in the extracted data and to release the associated subscriber threads to supply that data to the interested subscribers via the subscriber's interface 15 and the GSM network 6.

The administration unit 11 is provided to enable a systems operator or like personnel to configure or update the database 10. Typically, the administration unit 11 consists of processing capability which may be provided by the multiprocessor distributed processing system described above or may be provided by a dedicated processor.

Figure 4:
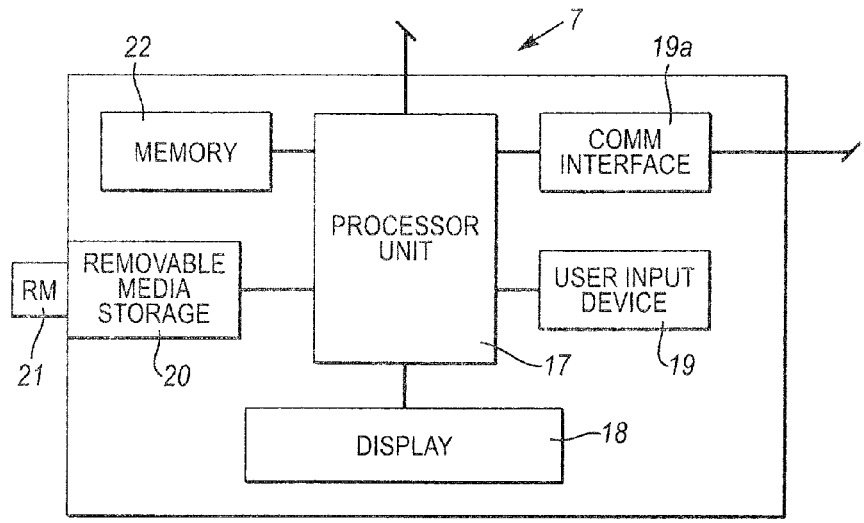
FIG. 4 shows a block diagram illustrating functional components of an administration section of the service provider shown in FIG. 2.

FIG. 4 shows a computer system that, when programmed, provides computer apparatus having the functionality of the information supplying apparatus 7 shown in FIG. 2. As shown, a processor unit 17 (which may be a multi-processor unit) is associated with a display 18 for displaying information to a systems operator or other user, a user input device 19 consisting of a keyboard and, typically, also a pointing device such as a mouse, a removable media storage 20 for receiving a removable medium (RM) 21 such as a floppy disk, CDROM or DVD disk and mass storage memory 22 which may, for example, be a hard disk drive arrangement or an allocated part of the memory associated the multiprocessor distributing processing system. The computer system may also have a communications interface 19a, for example a network card, enabling communication with other processors or computers on the same network or over an Intranet or the Internet.

Figure 5:
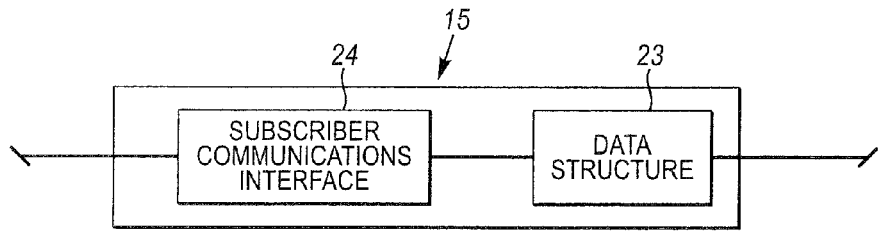
FIG. 5 shows a block diagram illustrating functional components of the client interface of the demand engine server shown in FIG. 3.

The subscriber interface 15 provides, as shown in FIG. 5, a data structure 23 for storing data carried on a subscriber thread if the associated subscriber is not able to receive that data and a subscriber communications interface 24 for dealing with communication over the GSM network 6 with subscribers using conventional Windows sockets.

In order to receive data from the service provider 4, each of the subscribers 5 must have a computer provided with GSM mobile telecommunications capabilities. Although the computer could, for example, be a portable notebook or laptop computer having mobile telecommunications capabilities, in this embodiment the computer comprises a palm top computer designed to operate under the Windows CE version 2.0 or higher operating system and provided with both a GSM card and a touch sensitive display or screen. Typically, the palm top computer may be the HP680 Jornada palm top computer supplied by Hewlett Packard although other palm tops of similar specification may be used.

Figure 6:
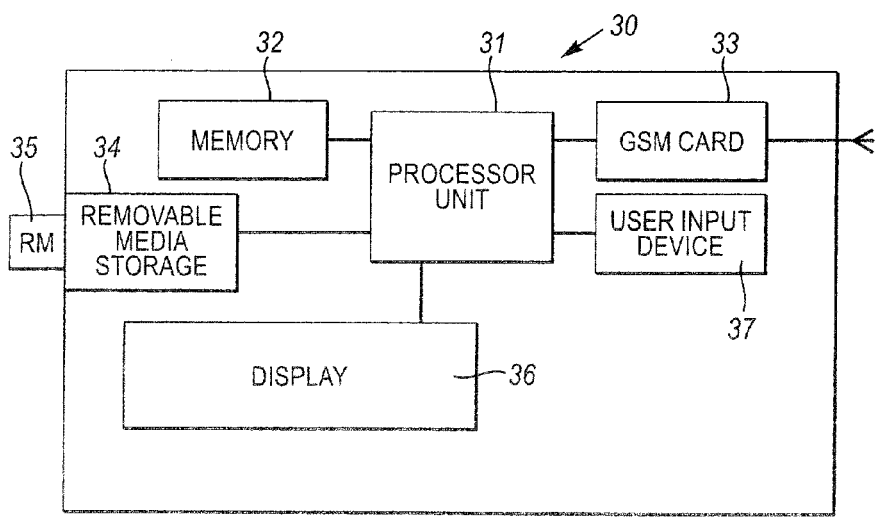
FIG. 6 shows a block diagram illustrating functional components of a subscriber's portable computer.

FIG. 6 shows a block diagram for illustrating the basic functional components of a subscriber's portable computer 30. As shown the portable computer comprises a processor unit 31 with associated memory 32, a GSM card 33, a removable media storage 34 for receiving a removable storage medium 35 such as a flash RAM card and a display 36 which also provides a touch sensitive screen for enabling user input. The portable computer 30 will generally also include a further user input device 37 in the form of a keyboard.

Program instructions and/or data for configuring the components of the subscriber information supplying apparatus 7 may be input using the user input device 19, supplied on a removable data storage medium 21 or supplied as a signal over the communications interface 19a or by any combination of these. Similarly, program instructions and/or data for configuring the subscriber's portable computer 30 may be supplied as a signal via the GSM card 33 or another communications interface (not shown), input via the user input device 37 or supplied on a removable storage medium 35 or by any combination of these.

The data stream provided via the TCP/IP connections 6b and 6c consists of packets of data provided either in a generic format in which the packets consist of a fixed number of fields delimited by "{" or in a digital form in which the packet have a variable number of fields with the fields being indicated by batecodes.

Data relating to a particular trading market or exchange contract is supplied in a single packet which has the basic format shown in FIG. 7a. Thus the packet consists of an exchange identification code 40 consisting of two to three characters, a symbol identification code 41 identifying the particular contract on the exchange and data fields 42 carrying the current price data for that contract. The contracts may be commodities (futures and options), stocks, indices or FOREX (foreign exchange). Where the symbol ID represents a future commodity then the symbol ID will include an expiry date while where the symbol ID represents an option commodity, then the symbol ID will include an expiry date and a strike price. To take an example, the exchange ID "17f" may represent the LIFFE (London Independent Financial Futures Exchange). Where this is followed by the symbol ID "Zmy" this may indicate the FTSE 100 with an expiry date of "my", where "m" represents the month and "y" represents the year of the expiry date. Where the contract is an options contract, then the symbol ID will have the format "Amysss" where "A" indicates the identity of the contract, "my" indicates the expiry date and the "sss" indicates the strike price. For a futures contract, then the price data field will include real time prices such as, for example, "ASK", "BID", "CLOSE" etc., prices.

The information provided by the information provider 2 need not be simply financial data but may include finance related news data. A single news item may span more than one packet. FIG. 7b shows a data structure for a news packet. As shown a packet for a news message will contain at least a header ("head code") 43 identifying the news item and the section within the news item plus a news body 44 contains at least a portion of the text from the news item. The packets need to identify which section of the news item is carried by the packet because the packets need not necessarily be transmitted in order.

FIG. 8 illustrates the main data stores of the database 10. These data stores include a customers data store 50, a subscribers data store 51, an exchanges data store 52, a subscriber entitlement data store 53, a symbols data store 54 and a data data store 55. Although not shown in FIG. 8, the database 10 will also include other data stores, for example data stores for storing data for accounting purposes including data for enabling billing of customers and data for determining the fees payable by the subscribers to the service provider 4.

The customers data store 50 includes a file for each of the customers of the service provider 4. Each customer file includes fields for a customer ID, the customers name and address and the number of subscribers that can be allocated to that customer.

Each customer file is related by its customer ID to one or more subscriber files in the subscriber data store 51. Each subscriber file includes fields for a subscriber ID, the customer ID, a subscriber name and a subscriber password. Each subscriber file may also contain further information regarding the status of a subscriber.

Each subscriber file in the subscriber data store 51 is related to a subscriber entitlements file in the subscriber entitlements data store 53 by its subscriber ID. Each file in the subscriber entitlements data store contains fields for the subscriber ID, the exchange IDs of the exchanges for which the subscriber is entitled receive data, the start and end date of the subscriber's entitlement and whether or not the subscriber's entitlement has been revoked.

Each subscriber entitlement file is related by the exchange IDs to one or more files in the exchanges data store 52. Each exchange file contains the exchange ID, the exchange name, the exchange type, that is whether the exchange is a commodities (future and options), stocks or indices exchange or a currency exchange (forex), together with data indicating the availability of the exchange.

The database 10 also includes a symbols data store 54 which contains a plurality of symbols files each of which associates a particular pattern with a corresponding exchange ID, the name of the company with which the contract is associated and the symbol type, where the symbol type identifies the type of the exchange, for example futures, options, index, stock, FOREX. Each pattern is related to a plurality of symbols provided by the information provider. Thus, for a futures and options contract where symbol is HBU9 (where HB represents the contract name while U9 represents an expiry date of September 1999) then the corresponding pattern will be HBmy where m and y are fields for expiry month and year and may represent any month and year. As will be appreciated all symbols for the contract name "HB", regardless of their expiry date, will be associated with the same pattern. The information stored in the symbols file is provided by or derived from the information provider 2 and enables the subscriber information supplying apparatus 7 to identify the contract to which a packet of data relates and to supply the data to the interested subscribers in a format or protocol defined by the service provider 4 for transmission of data to the subscribers over the GSM network 6.

Each customer file may be associated with more than one subscriber file enabling, for example, a company to be responsible for the payment for the usage of the system by a number of its employees, each of whom has his own individual subscriber file.

The data stored in the data stores 50 to 54 is static information that is input to the database 10 by a systems operator using the administration unit 11. The data in the exchanges and symbols data stores 52 and 54 is determined by information provided by the information provider 2 while the data in the data stores 50, 51 and 53 is partly supplied by the customers and subscribers and partly determined by the service provider 4.

The data data store 55 is provided to store data received via the TCP/IP connection 6c and parsed by the parser 9. The data store 55 thus stores the relevant data for each contract for which information is provided by the information provider 2.

Each financial exchange contract has its own data file identified by the corresponding symbol and exchange ID. The information in each data file is updated each time updated information is received for the corresponding contract from the information provider 2, as and when the price data changes. FIG. 8 shows typical price data fields. Any one or more of the price data fields for a contract may be updated at any one time. When updated information for a price data field is received, then the data already in that field in the relevant data file is replaced so that the data store stores only the most recently received data for each contract.

Figure 9:
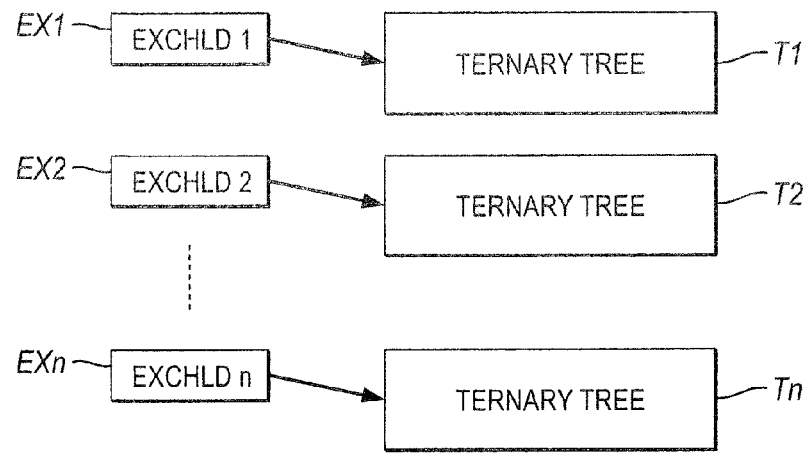
FIGS. 9 and 10 are diagrams for explaining a packet filter of the demand engine server shown in FIG. 3.
Figure 10:
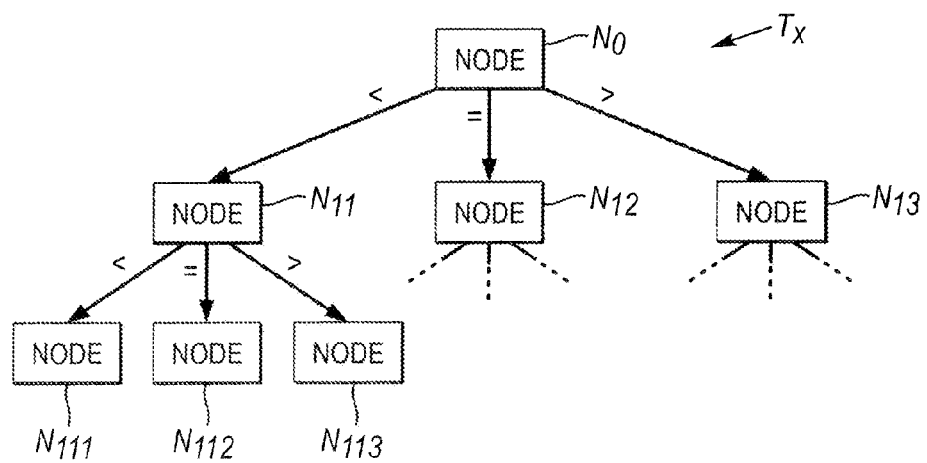

FIGS. 9 and 10 are diagrams for explaining the structure of the packet filter or profile store 14. In this embodiment, the packet filter has a ternary tree structure. Each exchange ID EX1, EX2, EXn stored in the database 10 is associated with a corresponding ternary tree structure T1, T2 . . . Tn as shown in FIG. 9. FIG. 10 shows a ternary tree structure Tx consisting of a hierarchical arrangement of nodes with a first or uppermost level having a single node No connected to three nodes $N_{11}$, $N_{12}$, $N_{13}$, of the second level of the hierarchy. Each node $N_{11}$, $N_{12}$, $N_{13}$ of the second level is connected to a respective set of three nodes in the third or next lower level.

Although, for simplicity, FIG. 10 shows only the nodes $N_{111}$, $N_{112}$, $N_{113}$ of the third level that are connected to the node $N_{11}$ of the second level it will be appreciated that the nodes $N_{12}$ and $N_{13}$ will also be coupled to three nodes in the third level. Although only three levels are shown, a ternary tree structure may consist of four or more levels, depending upon the data to be stored in the ternary tree.

The ternary tree associated with an exchange is used to store the alphanumeric patterns for the contracts on that exchange. Each node is associated with one alphanumeric character that may appear in the pattern. Each final or terminal node in the tree is associated with a particular pattern, for example the pattern "HBmy" identifies the financial contract "HB" and the fields "my" identify, for example, the month and year of expiry. Each pattern HBmy will be associated with contracts having the name HB and different expiry dates, that is each pattern will be associated with one or more symbols, for example one symbol may be "HBU9" representing a contract of name "HB" expiring in September 1999.

As noted above, each node is connected to three nodes in the next level in the hierarchy with the left hand connected node being associated with a character that is lower in the alphanumeric order and the right-hand node being associated with a character that is higher in the alphanumeric order. This is indicated in FIG. 10 by the "<" and ">" symbol, respectively.

The intermediate node represents the route that is followed by a search through the ternary tree structure when the character being searched for is the same as the character associated with the connected node in the previous level (represented by the "=" symbol). Thus, for example, where the stored patterns have the form "HBmy" where "HB" is an alphanumeric character representing the name of the contract and "m" and "y" are alphanumeric characters representing the month and year of expiry of the contract, then if, for example, the symbol is "HU9" where the characters "U9" represents September 1999 and the node No is associated with the character I, then a search for the symbol "HU9" will initially follow the left-hand branch of the tree structure because H is less than 1 in the alphanumeric order and then, when node $N_{11}$ is reached, the search will follow the intermediate branch to node $N_{112}$ because the character associated with the node $N_{11}$ will be H. When the node $N_{112}$ is reached, then the character associated with node $N_{112}$ is checked and the appropriate one of the three branches (not shown) connected to that node is followed, depending on whether that character is less than, greater than or equal to the next character B in the pattern and so on until a final node is reached that is associated with the pattern "HBmy".

Each such final node in the ternary tree is associated by the demand engine server 8 with the threads for the subscribers submitting profiles indicating in contracts having that pattern and particular expiry dates so that a search by the demand engine server through the ternary tree structure associated with a particular exchange will enable the demand engine server to identify the subscribers interested in a contract having a particular pattern and a sequential search can then be conducted to identify the subscribers interested in a particular expiry date identified by a received symbol.

The packet filter therefore effectively provides a client or subscriber profile store that associates each subscriber with the contract or contracts in which that subscriber is interested. A similar ternary tree structure may be provided for news items so that a subscriber need not necessarily receive all news items but may elect to receive news items only from a particular group of financial news suppliers.

The use of ternary tree structures enables efficient and rapid searching to determine the subscribers associated with, that is interested in, a contract associated with a particular pattern. It will, however, be understood that other storage and searching arrangements may be used, for example, hash tables which sprinkle the alphanumeric strings throughout an array or binary search trees which store the strings in order may be used. However, ternary tree structures provide the most efficient and therefore quickest way of searching for pattern or character strings of the type referred to above.

The operation of the system described above with reference to FIGS. 1 to 10 will now be described with reference to FIGS. 11 to 38.

The database 10 shown in FIG. 8 is assumed to have been populated by initial data supplied by the information provider 2 so that the exchanges data store 52 is populated by information identifying the exchanges for which the information provider 2 provides information and so that the symbols data store 54 has been populated by information associating each contract available on each exchange with the corresponding exchange ID and identifying the pattern and symbol used to identify that contract.

It will, of course, be appreciated that the exchanges and contracts for which the information provider 2 provides information to the service provider 4 may change from time to time in accordance with changes on the financial market and also changes in the contractual agreement between the service provider 4 and the information provider 2. Any such changes to the information stored in the exchanges and symbols data stores 52 and 54 will be provided to the service provider 4 via the information provider 2 so that a systems operator can update the exchanges and symbols data stores 52 and 54 using the administration unit 11.

Similarly, the customers, subscribers and subscribers entitlements data stores 50, 51 and 53 will be populated with information input by a systems operator using the administration unit 11 in accordance with data supplied to the service provider 4 by the customers and the contractual agreement between each customer and the service provider 4. In addition, the accounting data stores which are not shown in FIG. 10 will similarly be populated by initial information provided by the information provider 2 and the customers to the service provider 4. This information may, of course, be updated by the service provider 4 to allow for addition of customers and subscribers and for changes in the contractual relationship between the customers and the service provider.

Figure 11:
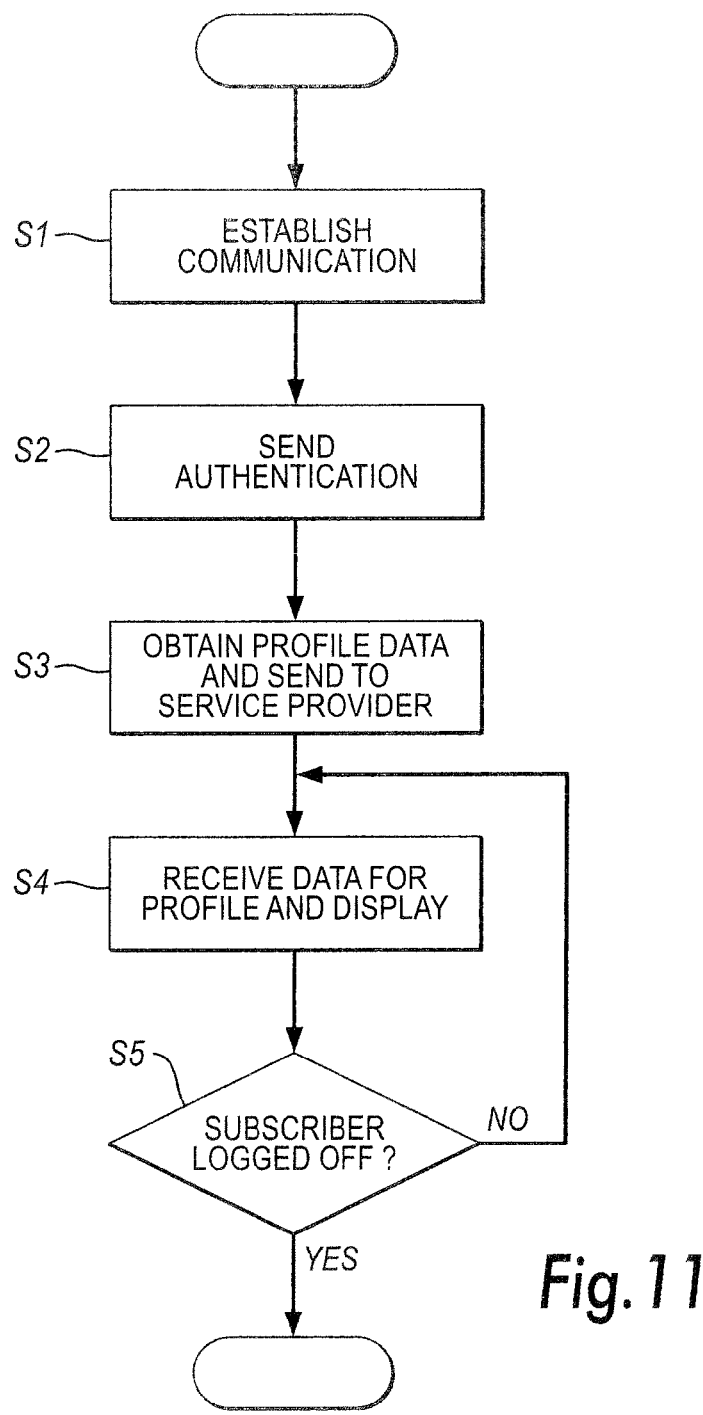
FIG. 11 shows a flow chart illustrating steps carried out by a subscriber's portable computer to receive data from the service provider.
Figure 12:
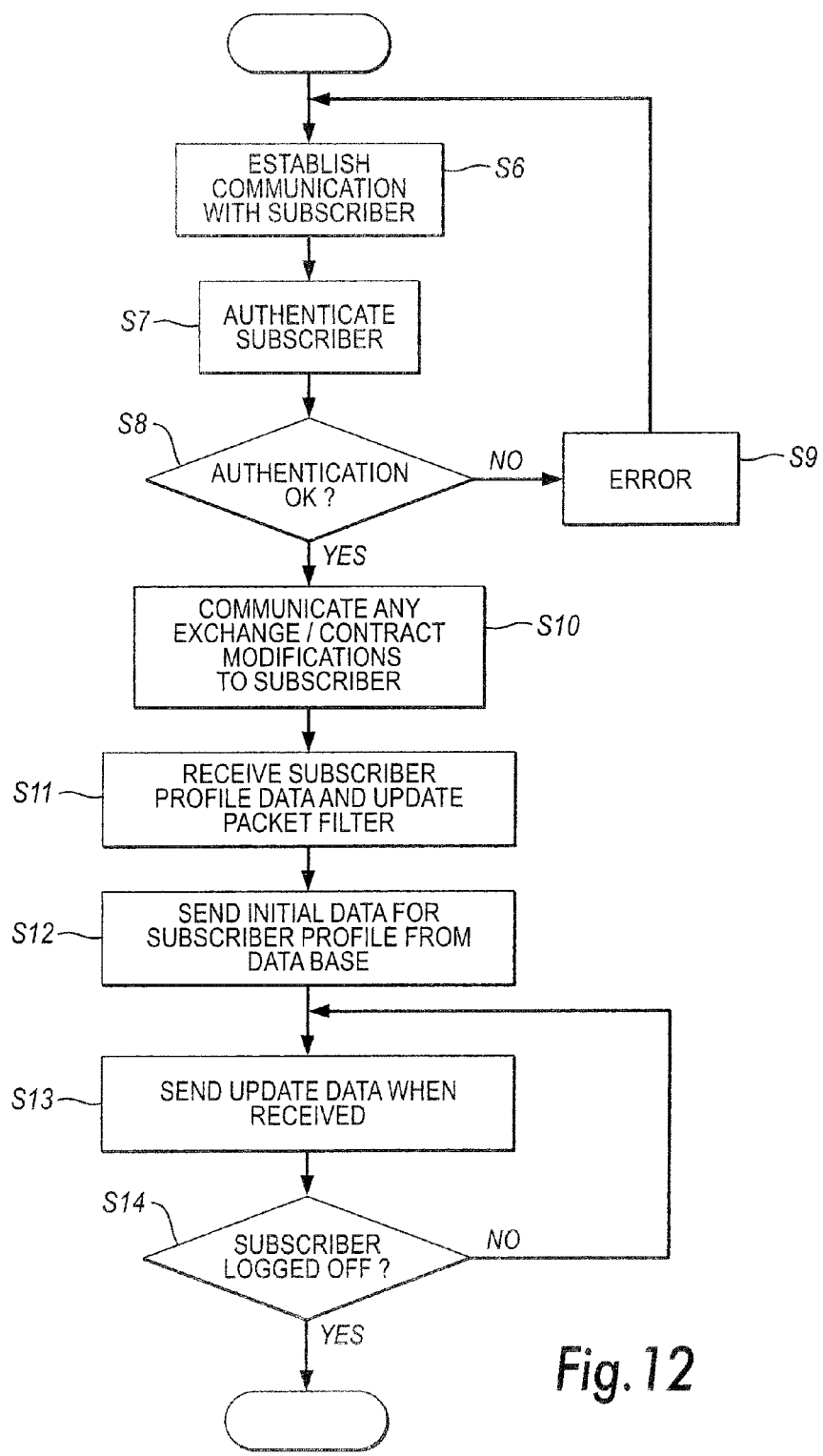
FIG. 12 shows a top level flow chart illustrating steps carried out by the service provider during supply of data to a subscriber.

Referring now to FIGS. 11 and 12, assuming that a subscriber's details have already been stored in the database 10 and the subscriber has been allocated a password or authentication code, then in order to log on to or start a session with the service provider 4, the subscriber 5 must first establish communication with the service provider 4 over the GSM network 6 (step S1 in FIG. 11). Then the subscriber enters his user name and authentication code or password into his portable computer 30 and the portable computer sends the information to the service provider 4 over the GSM network 6 at step S2.

The portable computer 30 then waits for the subscriber to enter profile data identifying the exchanges, contracts and filtering information (for example expiry date and strike price for a futures and options contract) in which the subscriber is interested in receiving information and then sends that profile data over the GSM network 6 to the service provider 4 (step S3). The portable computer 30 then waits for the requested data to be sent by the service provider 4 over the GSM network and, when the data is received, displays that data on its display 36 at step S4. The portable computer 30 continues to receive data from the service provider 4 over the GSM network 6 and to update the data displayed to the user until the portable computer 30 determines at step S5 that the subscriber wishes to log off.

FIG. 12 shows the steps carried out by the service provider 4 during communication with a subscriber. It will be appreciated that, because each subscriber or client is allocated its own thread by the demand engine server 8, the service provider 4 can communicate simultaneously with a number of different subscribers even though each of the subscribers may be receiving different information.

At step S6 in FIG. 12, the demand engine server 8 waits for requests for communication from a subscriber's portable computer and, when such a request is received, establishes communication with that subscriber (step S6). At step S7, the demand engine server receives the user name and authentication code or password supplied by the subscriber and at step S8 checks the subscribers data store 51 to determine whether the received password is a valid password and, if so, whether the subscriber ID that is automatically sent by the subscriber's portable computer when the subscriber attempts to log on agrees with the subscriber ID stored in the subscriber's data store 51 for that password (step S8). If the password is invalid or does not agree with the subscriber ID, then the demand engine server 8 communicates with the subscriber at step S9 and causes the subscriber's portable computer to display to the user a message indicating that, for example, the password is invalid. The user may then re-attempt communication by re-entering the password.

Once the subscriber has been authenticated, then the demand engine server 8 checks to see whether the database 10 contains any information regarding modifications by the information provider 2 to the exchanges and contracts available and if so communicates that information to the subscriber's portable computer at step S10 so as to enable the list of available exchanges and contracts stored in the memory 32 of the subscriber's portable computer to be updated.

At step S11, the demand engine server 8 receives from the subscriber's portable computer the subscriber profile data provided by the user and then updates the packet filter 14 so as to associate that subscriber and the filtering information (eg expiry date(s) included in the profile data with the nodes in the packet filter ternary tree structure for the patterns representing the contracts in which the subscriber is interested at step S11.

The demand engine server then accesses the data data store 55 in the database 10 and supplies to the user initial data from the database 10 for each of the contracts identified in the received subscriber's profile. This data will represent the data most recently received from the information provider 2 and stored in the data data store 55 because, as noted above, the information in the data data store 55 is continually updated as and when updated information is received from the information provider 2.

Once the subscriber's portable computer has been initialised with the data supplied from the data data store 55 (step S12 in FIG. 12), then the demand engine server 8 will supply to that subscriber's portable computer 30 updated information received via the TCP/IP connection 6b for any of the contracts identified in the subscriber's profile (step S13 in FIG. 13) until the demand engine server 8 determines at step S14 in FIG. 12 that the subscriber has logged off, that is the subscriber has ended the session.

As will be evident from the following explanation, a subscriber may subscribe with different profile data in different Windows. Where this is the case, then the subscriber will be sent the data corresponding to the subscribed profile to be displayed in the corresponding Window until the subscriber closes that particular Window or logs off.

The processing of data received by the subscriber information supplying apparatus 7 from the clients site processors CSP1 and CSP2 over the TCP/IP connections 6b and 6c will now be described in greater detail with reference to FIGS. 13 to 18.

Figure 13:
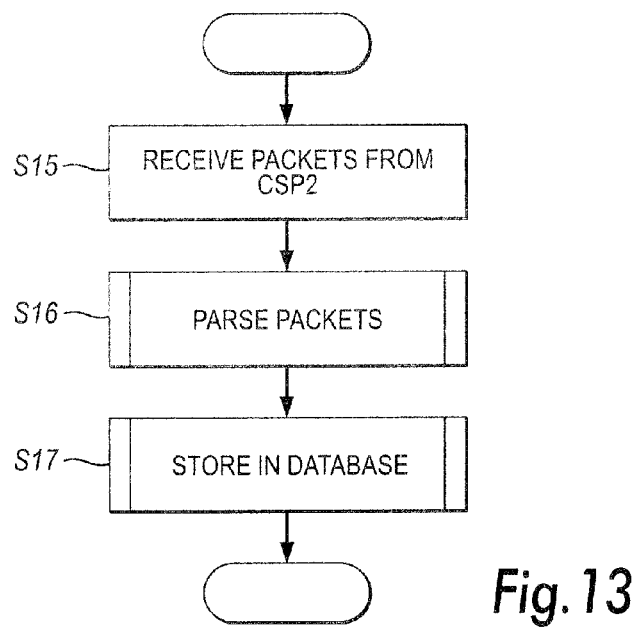
FIGS. 13 and 14 show flow charts for illustrating processing of data received by the service provider shown in FIG. 2 from the information provider shown in FIG. 1.

FIG. 13 shows a flow chart illustrating the basic operations carried out by the parser 9. As noted above, the parser 9 is continually receiving, over the TCP/IP connection 6c, packets of data from the client site processor CSP2. Typically, the data stream may consist of between 100 and 500 packets per second, depending upon the amount of activity on the financial markets, with each packet containing the price data that has changed for a particular contract. In this example, each packet contains up to 300 bytes.

As the data stream of packets is received by the parser 9 from the client site processor CSP2 at step S15, the parser 9 extracts the packets from the data stream and parses (step S16) the packets so as to determine the exchange ID and symbol (which also determines the relevant pattern) to enable the data to be stored in the relevant data file in the data data store 55 (step S17). The parser 9 carries out steps S16 and S17 continually so that the data stored in the database 10 is updated as and when updated price data for a contract is received from the information provider 2 via the client site processor CSP2.

Figure 14:
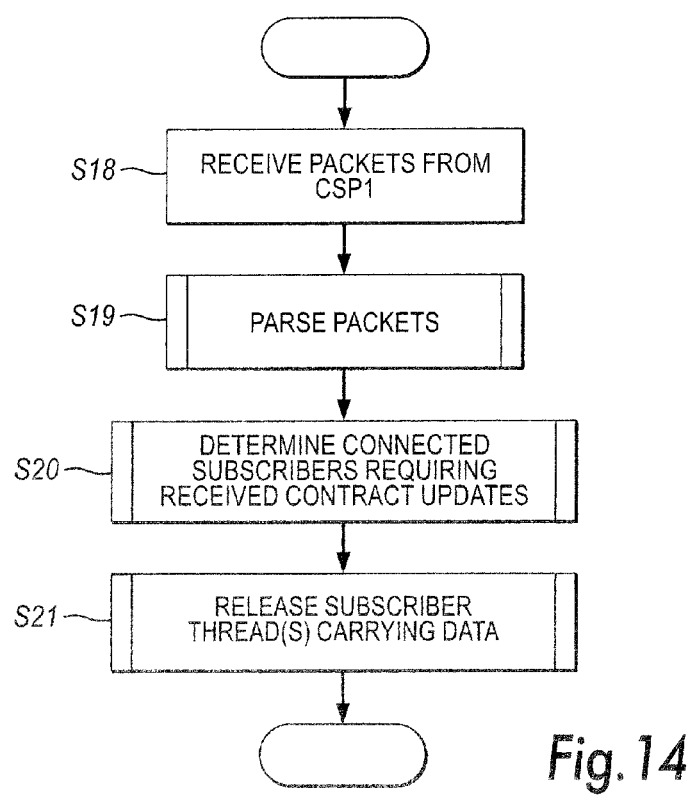

FIG. 14 shows a flow chart for illustrating the processing by the demand engine server 8 of the data stream received from the client site processor CSP1 via the TCP/IP connection 6b. The parser 12 of the demand engine server 8 continually receives, extracts and parses packets of data received from the client site processor CSP1 (steps S18 and S19 in FIG. 14). The operations carried out by the parser 12 at steps S18 and S19 correspond to the operations carried out by the parser 9 at steps S15 and S16. The operation of the demand engine server 8 differs from that of the parser 9 in that, once a packet has been parsed, the demand engine server 8 conducts a search through the ternary tree structures of the packet filter 14 to identify the node associated with the pattern for that packet and then determines which, if any, of the connected subscribers associated with that node have submitted a profile matching the symbol for the contract update information received in that packet (step S20). The demand engine server then releases at step S21 the subscriber threads associated with the identified node and matched profile so as to enable the contract update data to be supplied to the subscriber or subscribers identified from the packet filter (step S21).

FIG. 15a shows in greater detail the parsing of a financial contract data packet (step S16 in FIG. 13 or step S19 in FIG. 12). Thus, at step S29, the parser 9 or 12 identifies the exchange code in the extracted packet and then, at step S30, identifies the symbol ID or symbology and at step S31 extracts the price data fields.

FIG. 15b shows a flow chart illustrating parsing of a news data packet. Thus, at step S29a the parser 12 identifies the new code of the headline and at step S30a identifies the news body and at step S31a extracts the news data fields.

FIG. 16 illustrates in greater detail the step S17 carried out by the parser 9. Thus, at step S32, having identified the exchange ID and symbol ID, the parser 9 accesses the area of the data data store associated with the exchange and symbol ID carried by the extracted packet and then, at step S33, uses the price data code accompanying the price data in the packet to determine which price data fields for that contract are being updated and then stores the updated price data in the relevant field for that contract (step S33).

Figure 17:
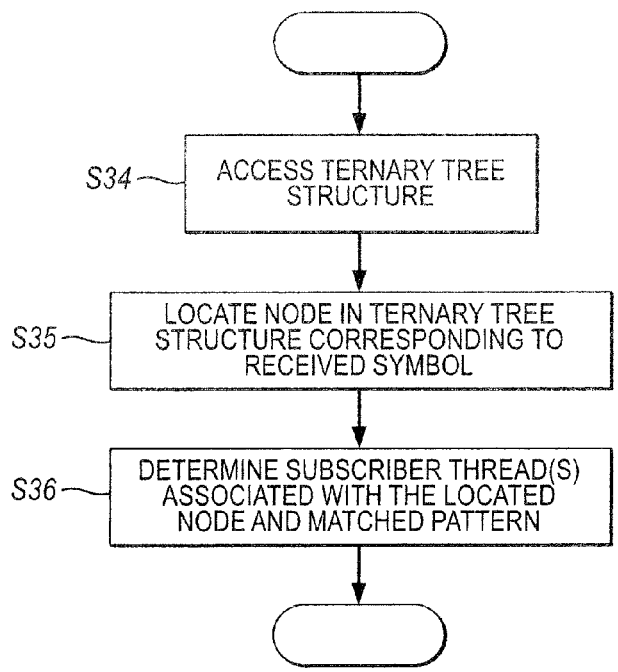
FIG. 17 shows steps carried out by the demand engine server shown in FIG. 2 to determine the subscriber(s) to which data should be supplied.

FIG. 17 shows step S20 of FIG. 14 in greater detail. Thus, once the parser 12 has parsed an extracted packet identifying the exchange ID and symbol ID or pattern, then the demand engine server 8 accesses the packet filter 14 at step S34 and then, at step S35, conducts a search through the ternary tree structure associated with the identified exchange ID as described above until the node associated with the pattern for the identified symbol is reached (step S35). The demand engine server then determines (step S36) the subscriber threads associated with the located or identified node and matched profile and releases the thread carrying the update data to the subscriber interface 15.

Figure 18:
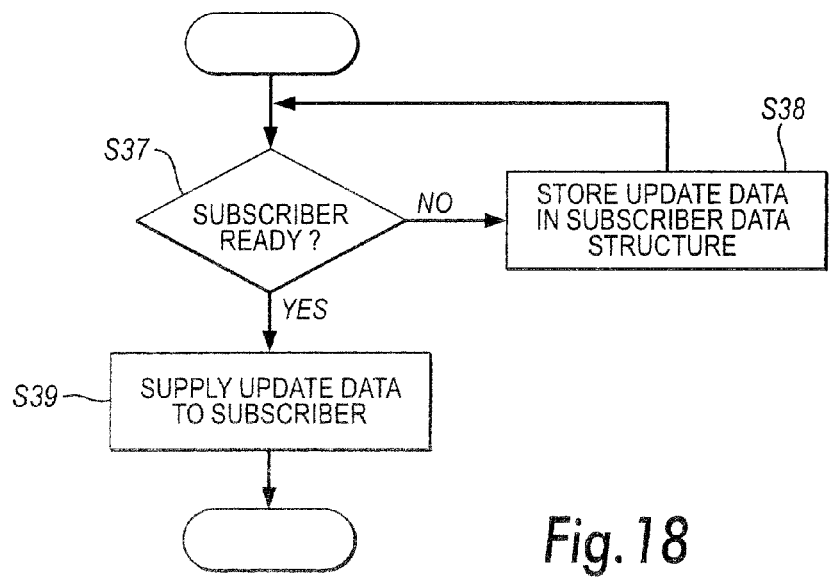
FIG. 18 shows a flow chart illustrating steps carried out in the supply of data to a subscriber.
Figure 19:
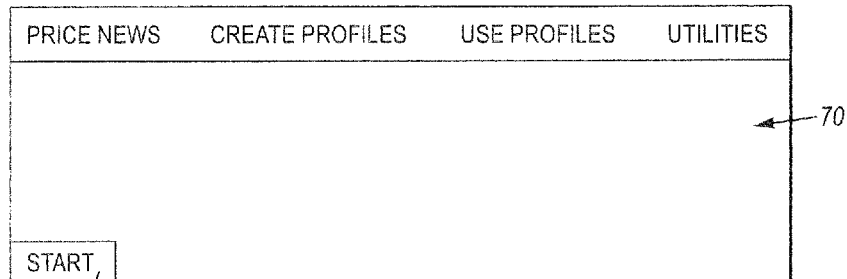
FIG. 19 shows diagrammatically a main menu displayed on a subscriber's portable computer display prior to the subscriber communicating with the service provider to start a session during which the subscriber will be supplied with data by the service provider.

FIG. 18 illustrates further steps in the communication of data with a subscriber. As will be appreciated, the subscriber information supplying apparatus 7 constitutes a multiprocessor system that is considerably more powerful than the subscriber's portable computer. This means that the subscriber information supplying apparatus 7 is potentially capable of supplying data at a faster rate than can be handled by the subscriber's portable computer so that, for example, the subscriber's portable computer may still be processing the last received set of data for display on the display 36 when the subscriber information supplying apparatus 7 wishes to send further update data. Accordingly, as shown in FIG. 18, before supplying update data to a subscriber, the demand engine server 8 checks at step S37 whether the subscriber is ready or available to receive data.

If the answer at step S37 is no, then the demand engine server 8 stores the update data in the data structure 23 for that subscriber (step S38) until the answer at step S37 is yes, the subscriber is able to receive update data. If further update data is received before the subscriber is ready or able to receive data, then the data stored in the subscriber data structure 23 at step S38 is replaced by that updated data. This ensures that, despite any processing limitations of the subscriber's portable computer, the subscriber receives the most up-to-date price data possible.

When the answer at step S37 is yes, then the update data is supplied to the subscriber's portable computer via the subscriber interface 24 and the GSM network 6 using the GSM protocol. Although the current GSM standard provides a bandwidth of only 9600 bps, subscribers can still receive financial data in virtually real time because, once the subscriber's portable computer has been initialised with data taken from the database 10, the only data that needs to be sent to the subscriber's portable computer over the GSM network 6 is the data that has changed for the specific contracts in which the subscriber is interested. This means that the amount of data that must be supplied to the subscriber over the GSM network to keep the subscriber up-to-date is considerably smaller than the amount of data received by the subscriber information supplying apparatus 7 from either client site processor CSP1 or CSP2. This allows the subscribers to receive continually updating financial data over the GSM network which, because of the relatively limited bandwidth of the GSM network, would not be possible if the information was being supplied directly from the information provider 2.

The system described above will now be further explained by way of reference to examples of screens displayed to the user on the display 36. As noted above, the subscriber's portable computer will generally be a palm top running the windows CE operating system which, as is well known in the art, enables a user to launch an application once the computer has been powered up by either clicking on an icon associated with that application or by selecting the application from the start menu. Once this has been done, then the processor unit 31 displays to the user a display screen requesting the user to insert their user name and password and once the user name and password has been verified as described above, the processor unit 31 displays to the user the main screen 70 shown in FIG. 19 which includes a start button 71 for enabling powering down of the computer and access to other applications and a number, five as shown, of main menus buttons. In this example, the main menus consist of "prices", "news", "create profiles", "use profiles" and "utilities". The utilities main menu is, in this example, provided simply to enable the user to change their password and will not be described in greater detail herein.

The "prices" main menu is provided to enable a user to create profiles for either immediate use or storage in the memory of the portable computer 30 for later use while the "news" menu enables a user to request receipt of financial news data from the service provider 4. The "create profiles" main menu enables a user to create profiles for storage on the portable computer for future use while the "use profiles" main menu enables the user to access a previously stored profile and submit that to the service provider.

Figure 20:
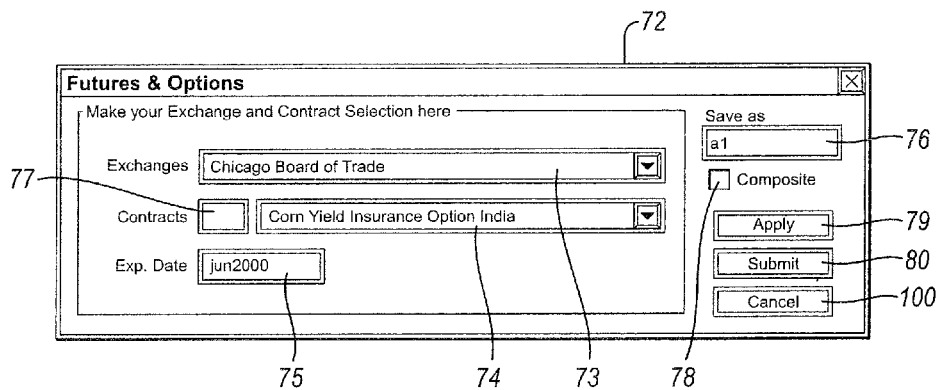
FIGS. 20 to 25 show screens that may be displayed to a subscriber on their portable computer to enable creation of a subscriber profile identifying the group of sets of data that the subscriber wishes to receive from the service provider.
Figure 22:
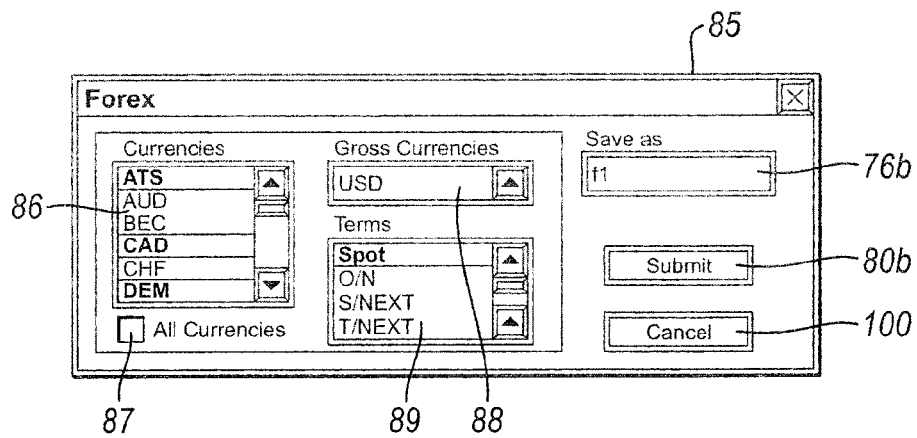
Figure 23:
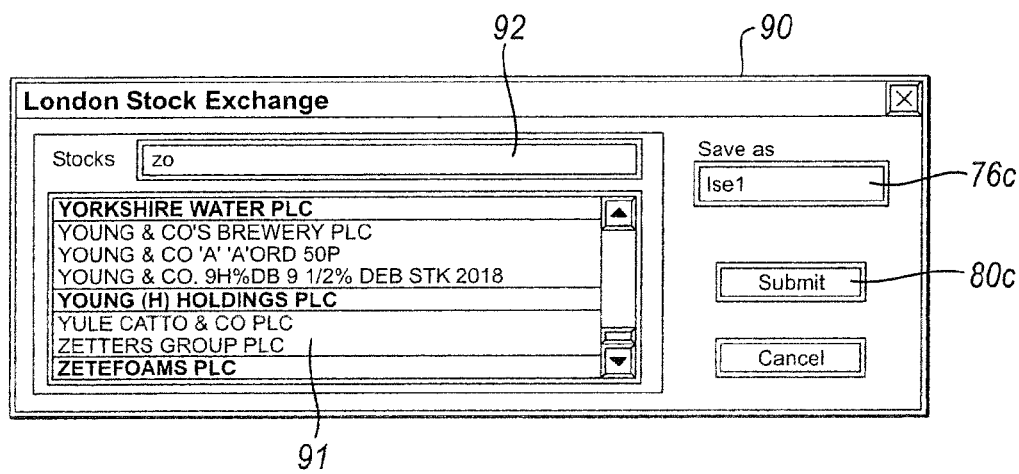

The "prices" main menu when selected offers the options of creating a standard futures and options profile, an index profile, a FOREX (foreign exchange) profile and a stock profile. FIG. 20 shows the screen 72 displayed when futures and option is selected from the prices main menu while FIGS. 21, 22 and 23 show, respectively, the screens 81, 85 and 90 displayed when index, FOREX (foreign exchange) and stock, respectively, are selected from the prices main menu.

The futures and options display 72 shown in FIG. 20 has a window 73 for displaying the list available exchanges stored in the memory 32, a window 74 for displaying available contracts stored in the memory 32 for the exchange shown in the window 73, a window 75 for enabling a user to specify an expiry date for contracts, a window 76 for enabling a user to save an exchange and contract selection, a search window 77 for enabling a user to enter, for example, the first four characters of a contract to enable a user to search for a particular contract from the list stored in the memory 32 of his portable computer. The screen 72 also provides a composite window 78 which, when the user clicks in the composite window, selects a display option for contract data in which contract data for contracts of the same type (that is for example all futures and options contracts) to be displayed in the same window on the display 36. Each of the windows 73 and 74 is associated, as is well known with the windows CE operating system, with a downwards arrow that enables the complete list of exchange names and contract names stored in the memory 32 of the portable computer 30 to be displayed to the user so as to enable the user to select a particular exchange and contract by clicking on that exchange and contract.

Once the user has confirmed that the required exchange and contract are displayed in the windows 73 and 74, the user clicks on an apply button 79 to add the selected contract to his futures features and options profile. The user may then repeat the above process. Each time the apply button 79 is clicked the displayed exchange and contract will be added to the user's futures and options profile. If the user has allocated a name or mnemonic to the profile in the window 76 then the profile will be stored in the memory 32 so that it can be retrieved and used for future sessions after the present session has ended. Otherwise, the profile is stored in the memory 32 only for the duration of the current session. Once the user is happy with the selection of exchanges and contracts and wishes to start a session, then the user clicks on a submit button 80. The processor unit 31 then reads the data stored in the memory 32 for the created profile and supplies that to the demand engine server 8 over the GSM network 6 using the protocol determined by the software installed on the portable computer so as to enable the service provider 4 to identify the exchanges and contracts required by the subscriber and to store this information in the packet filter 14 as described above.

Figure 21:
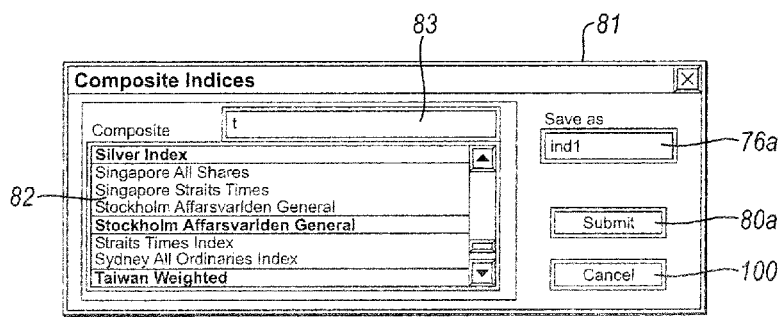

FIG. 21 shows the screen 81 displayed to the user when the user selects the "index" option from the prices menu. Again this has a window 82 for displaying available indices. This window may, as is well known in the art, display a single line in a manner similar to that shown for window 73 in FIG. 20 or may be expanded as shown in FIG. 21 to enable a user to scroll through the list of indices stored in the memory 32. This window is also associated with a search criteria window 83 to enable a user to select a particular index by entering, for example, the first four or more characters of the index name and, again, the user can optionally allocate a name or mnemonic to the profile so that the profile can be saved in the memory 32 for use in subsequent sessions after the current session has ended. In this example, once the user is satisfied with their index selection, then the user clicks on a submit button 80a at which point the processor unit 31 reads the data input by the user and submits the profile to the service provider 4 over the GSM network 6 in accordance with the predetermined protocol with the service provider 4.

FIG. 22 shows the screen 85 displayed when the user selects the 'FOREX' option. As shown there is a currency display window 86, a box 87 to select all currencies, a window 88 to select the cross currency to which the exchange rate is referenced, a terms window 89 to enable a user to select the types of price data he wishes to receive, a profile saving window 76b and a 'submit' button 80b as before.

FIG. 23 shows the screen 90 displayed when the user selects the London Stock Exchange from stock options under the prices menu. This screen provides a window 91 for displaying to the user the list of stock names stored in the memory 32, a search criterion window 92 for enabling a user to input characters in part of a stock name to enable that stock name to be retrieved from the stored list, a window 76c for enabling a user to allocate a name or mnemonic to the stock profile so that it is stored in the memory 32 for retrieval for future sessions and a submit button 80c for enabling submission of the profile to the service provider 4 in a manner similar to that described above for the futures and options, indices and FOREX profiles.

Each of the above described windows also has a cancel button 100 for enabling cancelling of a profile where the user finds they have made a mistake.

Figure 24:
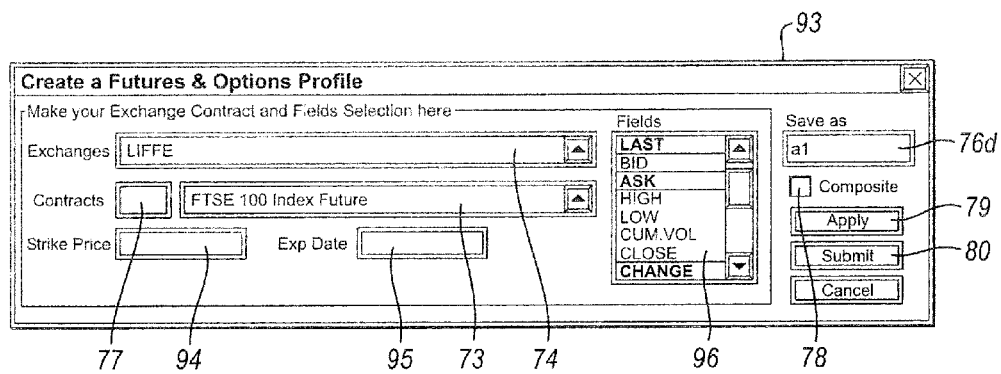
Figure 25:
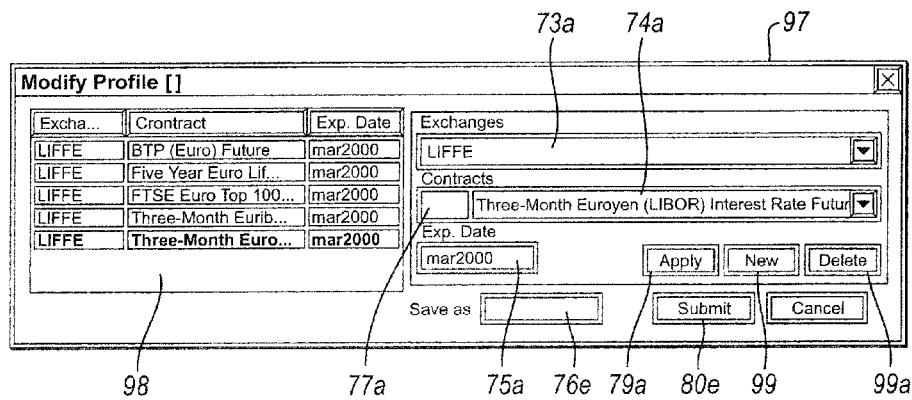

In this embodiment, the user may also create a futures and options profile using the "create profiles" main menu. FIG. 24 shows the screen 93 displayed to the user when this option is selected. As can be seen from a comparison with the screen 72 shown in FIG. 20, this screen provides a user with more options than the standard futures and options profile. In particular, the screen 93 enables a user to set a strike price in a strike price window 94 and to define the list of price data fields in which the user is interested in a fields window 96. In this case, each time a price data field is selected the user clicks on the apply button 79 to add that to the profile. Again, as in the case of the standard futures and options profile, the user can click in the composite window 78 to select the composite option to enable price data for different contracts to be displayed in the same window.

As described above, each time the user clicks on the submit button, the profile defined by the user is transmitted over the GSM network 6 to the service provider 4 and the packet filter 14 of the demand engine server is updated so as to associate the relevant nodes in the packet filters with that subscriber. The subscriber may submit only a single profile or may submit a number of different profiles for the same session each having a separate window. (If a subscriber closes a window, then the subscriber will no longer receive data for the profile defined by that window).

In the present arrangement, the system is configured such that a profile cannot be modified during a session unless the profile is a futures and options profile for which the composite option has been selected. Where the composite option has been selected, then the user may modify the composite profile during a session by acting upon, in this double-clicking on, the corresponding output screen. When this is done, then the processor unit displays to the user the screen 97 shown in FIG. 25 which has a first window 98 displaying the current contracts selected for the composite profile and windows 73a, 74a, 77a and 75a corresponding to windows 73, 74, 75 and 77 shown in FIG. 20 to enable further exchanges and contracts and expiry dates to be selected by a user and added to the profile by clicking on the "new" button 99. An existing contract may be deleted from the profile by selecting the contract and clicking on the "delete" button 99a. An existing contract may be modified by highlighting the contract, changing the profile data (for example the expiry data) and then clicking on the apply button 79. Again, if a name or mnemonic has been allocated in the window 76e, the processor unit 31 will save the profile under that name or mnemonic in the memory 32 for use in future sessions after the current session has ended.

In order to submit the modified composite profile, the user then clicks on the submit button 80e and the modified profile is submitted to the service provider in the manner described above.

When the user selects the "news" option from the main menu, then the user will be given the option of subscribing to the news service provided by the information provider and, if the user chooses to subscribe, this information will be sent to the service provider 4 over the GSM network 6.

Figure 26:
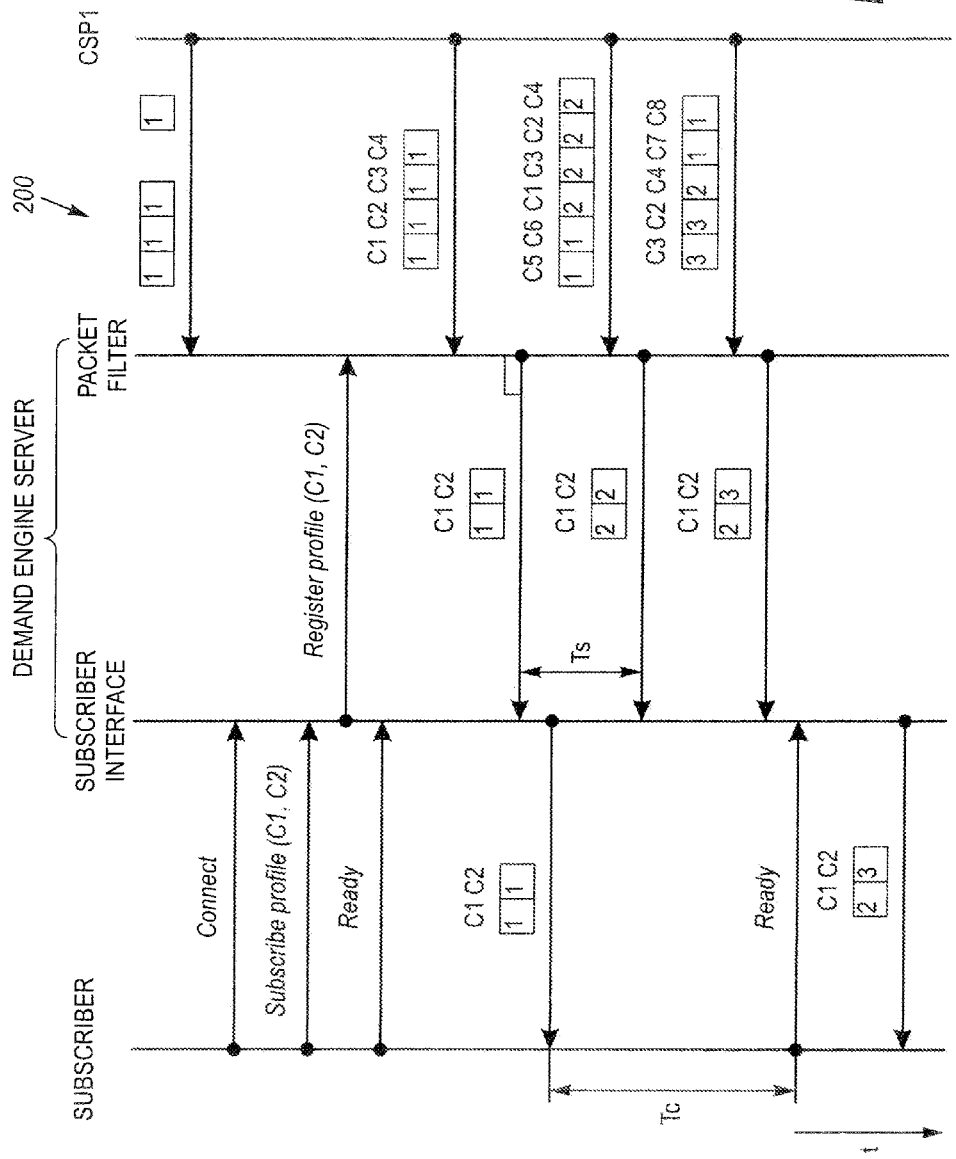
FIG. 26 shows a diagram illustrating the exchange of information between the service provider and the subscriber during a session.

FIG. 26 shows a diagram for illustrating the sequence of events in communication between one particular subscriber and the demand engine server 8 on the one hand and between the demand engine server 8 and the client site processor CSP1 on the other hand. The arrow labelled "t" in FIG. 26 indicates the direction of increasing time.

Prior to the subscriber establishing communication or connection with the demand engine server 8, the client site processor CSP2 is sending packets 200 of data to the demand engine server which will be extracted by the parser 9 and used to update the data stored in the database 10. Subsequently, as shown in FIG. 26, this particular subscriber establishes connection with the demand engine server 8 and submits a profile indicating interest in contracts C1 and C2. This profile may be any of the profiles described above with reference to FIGS. 20 to 25.

The demand engine server takes the received profile data and registers that profile 8 data in the packet filter 14 so that this particular subscriber is associated with the nodes of the packet filter corresponding to the patterns for the contracts C1 and C2 identified by the registered profile. At this time, the demand engine server 8 will also initialise the subscriber's session by communicating to the subscriber over the GSM network the current data for the contracts C1 and C2 from the database 10. Once the subscriber's portable computer 30 has received and processed this data for display to the user, then the portable computer 30 sends a ready signal back to the demand engine server 8 indicating that it is ready to receive update data. During this time, the client site processor CSP1 is continuing to send the stream of packets received from the information provider to the demand engine server 8 over the TCP/IP connection 6c. Price updates relating to the contracts C1 and C2 in the subscriber's registered profiles will then be forwarded to the subscriber via the subscriber interface 15. Generally, the processor unit 31 will take a time period Tc (typically approximately 1 second) to process the received data for display to the user. However, as shown in FIG. 26, the time period Ts between receipt of updated data for contracts in the subscriber's profile may, dependent on the market activity, be considerably shorter than Tc so that the demand engine server 8 will have newly updated price data to send to the subscriber before the subscriber indicates that it is ready again to receive data. Where this is the case, then as described above, the newly updated data may be stored in the data structure 23 (FIG. 5). If, as shown in FIG. 26, the subscriber does not indicate to the demand engine server that it is ready to receive further data until another set of updated data for the contracts C1 and C2 has been received by the demand engine server 8, then the intermediate set of update data will be discarded and only the most recently received updated data will be forwarded to the subscriber. This means that the stream of data to the subscriber is fragmented and that some updates are omitted. However, it has the advantage that the subscriber can be sure that the data received is the most recent update and that there is no backlog of updates at the demand engine server 8 awaiting supply to the subscriber. Of course, if the processor unit 31 of the portable computer is sufficiently powerful or there is little activity in relation to a contract, then the time period Tc may be comparable to the time period Ts so that all update data is supplied to the subscriber. Similarly, all update data may be supplied to the subscriber if the subscriber's computer has sufficient memory capacity to store new update data while previously received update data is being processed for display to the user. Where the processor unit 31 is sufficiently powerful or the portable computer has sufficient memory to achieve this, then the protocol may be modified so that the demand engine server 8 does not await a ready signal from the subscriber but sends the updated data to the subscriber as and when it is received in accordance with the TCP/IP protocol over the GSM network.

FIGS. 27 to 31 show examples of how received data is displayed on the display 36 to a user for different types of profile. FIGS. 27, 28, 29, 30 and 31 show, respectively, a standard futures profile, a standard options profile, a regular options profile, a composite futures profile and a FOREX profile. FIG. 32 shows how received data is displayed to a user for an index profile while FIG. 33 shows how received data is displayed to a user for a stock profile.

FIG. 34 shows the screen displayed to a user when the news service is selected. As can be seen for FIG. 34, although the service provider 4 communicates the entirety of each news item to the portable computer 30, initially only the headlines for each news item are displayed on the display 36. However, the user can elect to see the full text of a news item by clicking on the headline for that news item. FIG. 35 shows a typical example of the display of a news item. Each screen will be displayed in a separate window and these windows may, as is well known in the Windows CE art, be displayed separately, tiled or cascaded.

The above description assumes that the signal over the GSM network never drops out during a session. If, however, the signal does drop out, then the user will be notified in the title bar of the relevant window that the signal has been lost and that reconnection is being attempted. Once the physical link over the GSM network has been re-established, then the portable computer will automatically resend the subscriber's profiles so as to re-establish transmission of data.

It will be appreciated that the screens described above represent only an example and that the user may be provided with different profile selection and display options. Also, although in the above described embodiments, information received over the GSM network from the service provider 4 is displayed to the user using a standard Windows CE graphical user interface, other graphical user interfaces may be used. For example, a web graphical user interface such as Microsoft Internet Explorer may be used. In addition, the computer need not necessarily be arranged to operate using a Windows or Windows CE operating system. For example, the software may be adapted to run on, for example, the EPOCH 32 operating system or the PALMOS operating system. Also, data searching techniques other than the ternary tree structure described above may be used, for example so called HASH tables or binary tree structures may be used although these may be less efficient. In addition, the present invention is not dependent on the particular information provider and may be implemented using financial data supplied via different information providers. Also, the financial data need not necessarily be supplied to the service provider via a satellite communications link but could, for example, be via a dedicated land communications link especially if the information provider 2 is located physically close to or at the same location as the service provider 4. In addition, the client site processors CSP1 and CSP2 may be located remote from the subscriber information supplying apparatus, provided that a communications link can be established between the client site processors and the information supplying apparatus. Furthermore, communication protocols other than the TCP/IP protocol may be used, if desired.

The present invention may be applied wherein a subscriber wishes or needs to receive data via a mobile telecommunication network. The subscriber's computer may be a desktop computer having only mobile telecommunications facsilities (that is having no land line connection) on a combined computer and mobile telephone.

Although the above described embodiments relate to the supply of real time updating financial data, the present invention may be applied to the supply of any rapidly changing data such as racing information for example horse racing information, or other betting or similar gambling products.

The invention claimed is:

1. An apparatus comprising:
   a connection for receiving data sets, wherein the data sets include continuously changing information; and
   a demand engine server configured:
   to establish a session with a subscriber device;
   to receive from the subscriber device data identifying a subscriber profile for a user of the subscriber device, the subscriber profile identifying a plurality of data sets of interest to the user of the subscriber device, each data set including first information that is non-changing and second information that changes; and
   until the demand engine server determines that the subscriber device has ended the session, to send for any of the plurality of data sets identified in the subscriber profile only the continuously changing second information for that data set to the subscriber device;
   wherein the apparatus further includes a database and the demand engine server is operatively connected to the database, the database storing the first information,
   wherein after the demand engine server receives a request from a subscriber device for information about data sets identified in the subscriber profile data, the demand engine server first sends the first information for each of the data sets identified in the subscriber profile data from the database to the subscriber device and then sends the continuously changing information for each of the data sets identified in the subscriber profile data to the subscriber device,
   wherein the first information includes initial values of the second information initially available to the demand engine server.

2. The apparatus of claim 1 wherein the demand engine server checks for any new update to the non-changing information stored in the database, and wherein if there is new update to the non-changing information the demand engine server sends the new update to the database to update the non-changing information.

3. The apparatus of claim 2, wherein the non-changing information stored in the database includes one or more exchanges and/or contracts, and wherein the new update includes one or more new exchanges and/or contracts.

4. The apparatus of claim 3, wherein the one or more data sets requested by the subscriber device includes data about one or more new exchanges and/or contracts, and wherein the continuously changing information includes changes to the data about the one or more new exchanges and/or contracts.

5. The apparatus of claim 1, wherein the demand engine server checks for any new update to the non-changing information stored in the database, and wherein if there is new update to the non-changing information the demand engine server sends the new update to the database to update the non-changing information.

6. The apparatus of claim 5, wherein the non-changing information stored in the database includes one or more exchanges and/or contracts, and wherein the new update includes one or more new exchanges and/or contracts.

7. The apparatus of claim 6, wherein the one or more data sets requested by the subscriber device includes data about one or more new exchanges and/or contracts, and wherein the continuously changing information includes changes to the data about the one or more new exchanges and/or contracts.

8. An apparatus comprising:
a connection for receiving data sets, wherein the data sets include continuously changing information; and
a demand engine server configured;
to establish a session with a subscriber device;
to receive from the subscriber device data identifying a subscriber profile for a user of the subscriber device, the subscriber profile identifying a plurality of data sets of interest to the user of the subscriber device, each data set including first information that is non-changing and second information that changes; and
until the demand engine server determines that the subscriber device has ended the session, to send for any of the plurality of data sets identified in the subscriber profile only the continuously changing second information for that data set to the subscriber device,
wherein the one or more data sets requested by the subscriber device includes data about one or more new exchanges and/or contracts, and wherein the continuously changing information includes changes to the data about one or more new exchanges and/or contracts.

\* \* \* \* \*